US009841853B2

(12) United States Patent
Pai et al.

(10) Patent No.: US 9,841,853 B2
(45) Date of Patent: Dec. 12, 2017

(54) TOUCH PANEL MODULE AND TOUCH CONTROLLER THEREOF

(71) Applicant: Novatek Microelectronics Corp., Hsinchu (TW)

(72) Inventors: Ching-Yang Pai, Taipei (TW); Chih-Chang Lai, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 213 days.

(21) Appl. No.: 14/636,197

(22) Filed: Mar. 3, 2015

(65) Prior Publication Data

US 2015/0317025 A1 Nov. 5, 2015

Related U.S. Application Data

(60) Provisional application No. 61/988,320, filed on May 5, 2014.

(30) Foreign Application Priority Data

Aug. 12, 2014 (TW) .............................. 103127635 A

(51) Int. Cl.
  *G06F 3/044* (2006.01)
  *G06F 3/041* (2006.01)
(52) U.S. Cl.
  CPC ............ *G06F 3/044* (2013.01); *G06F 3/0416* (2013.01)
(58) Field of Classification Search
  CPC ................... G06F 3/044; G06F 3/0412; G06F 2203/04111; G06F 3/0416;

(Continued)

(56) References Cited

U.S. PATENT DOCUMENTS 7,190,336 B2  3/2007 Fujisawa
9,081,453 B2 * 7/2015 Bulea ..................... G06F 3/044

(Continued)

FOREIGN PATENT DOCUMENTS

CN  102929464  2/2013
CN  103246422  8/2013

(Continued)

OTHER PUBLICATIONS

"Office Action of Taiwan Counterpart Application", dated Nov. 3, 2015, p. 1-p. 3.

(Continued)

*Primary Examiner* — Carolyn R Edwards
*Assistant Examiner* — Scott Au
(74) *Attorney, Agent, or Firm* — JCIPRNET

(57) ABSTRACT

A touch panel module and a touch controller thereof are provided. The touch controller includes a plurality of signal processing channels configured to control the touch panel. The touch panel is electrically connected to the touch controller. The touch panel includes a plurality of first electrodes and a plurality of second electrodes. The first electrodes are electrically connected to the corresponding signal processing channels of the touch controller by using a plurality of first signal routes. The second electrodes are electrically connected to the corresponding signal processing channels of the touch controller by using a plurality of second signal routes. The touch panel is divided into a plurality of areas. A number of the signal processing channels of the touch controller is determined according to a number of the first signal routes, a number of the second signal routes and a number of the divided areas.

24 Claims, 9 Drawing Sheets

(58) Field of Classification Search
CPC . G06F 2203/04112; G06F 2203/04106; G06F 1/16
See application file for complete search history.

(56) References Cited

U.S. PATENT DOCUMENTS

| | | |
|---|---|---|
| 2004/0125053 A1 | 7/2004 | Fujisawa |
| 2010/0149108 A1 | 6/2010 | Hotelling et al. |
| 2011/0279409 A1* | 11/2011 | Salaverry ............ G06F 3/0416 345/174 |
| 2015/0261348 A1* | 9/2015 | Jang ..................... G06F 3/044 345/174 |

FOREIGN PATENT DOCUMENTS

| TW | 200411518 | 7/2004 |
|---|---|---|
| WO | 2013106773 | 9/2013 |

OTHER PUBLICATIONS

"Office Action of China Counterpart Application," dated Aug. 1, 2017, pp. 1-8, in which the listed references were cited.

* cited by examiner

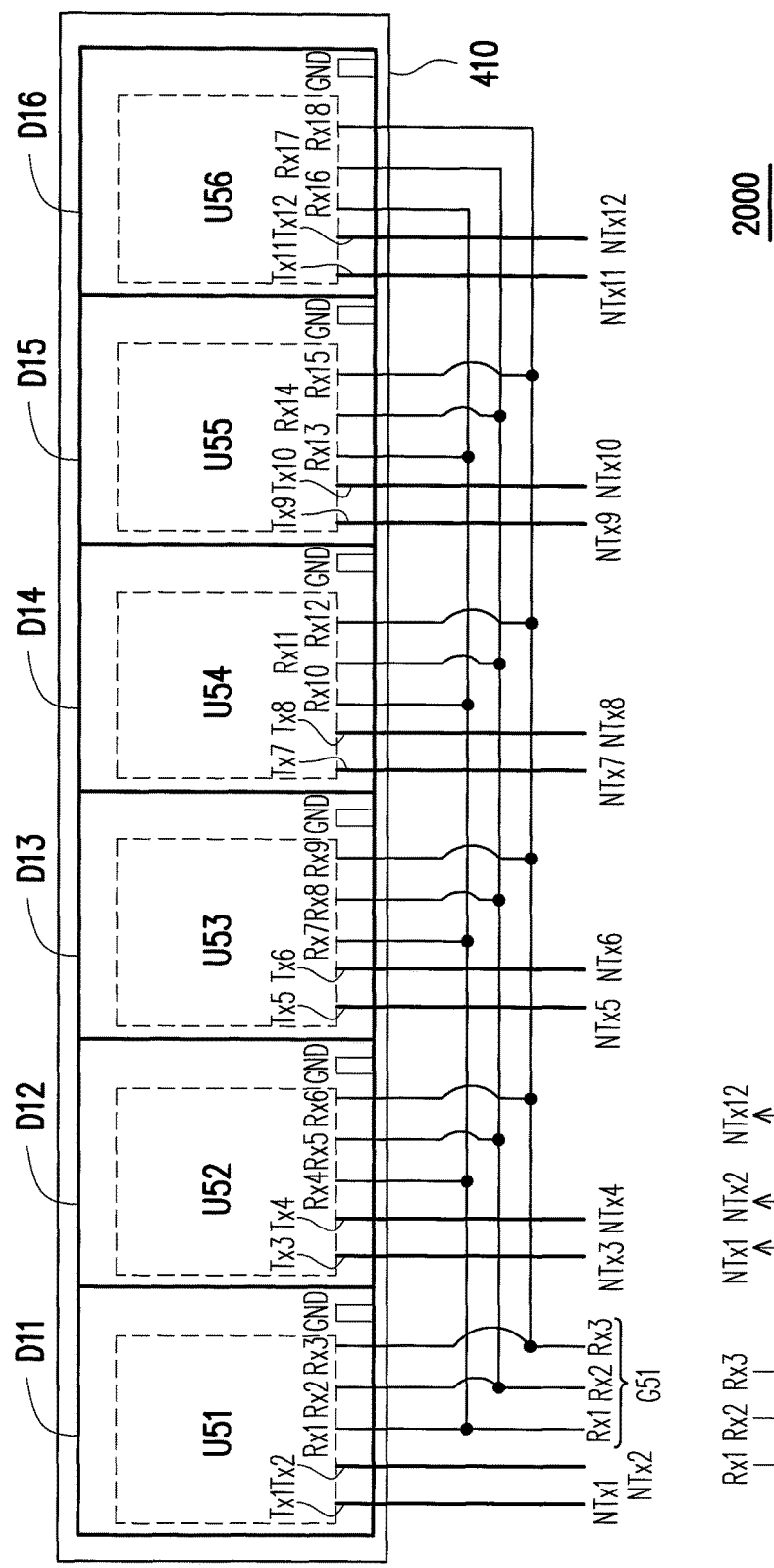
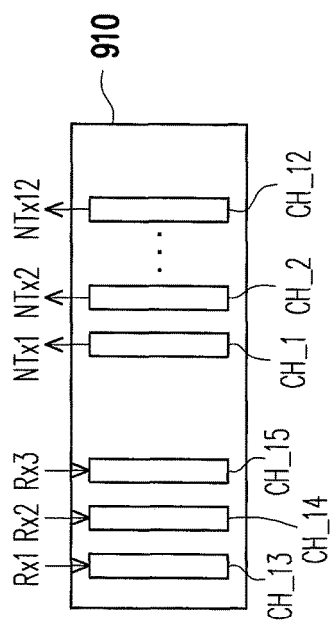
FIG. 5

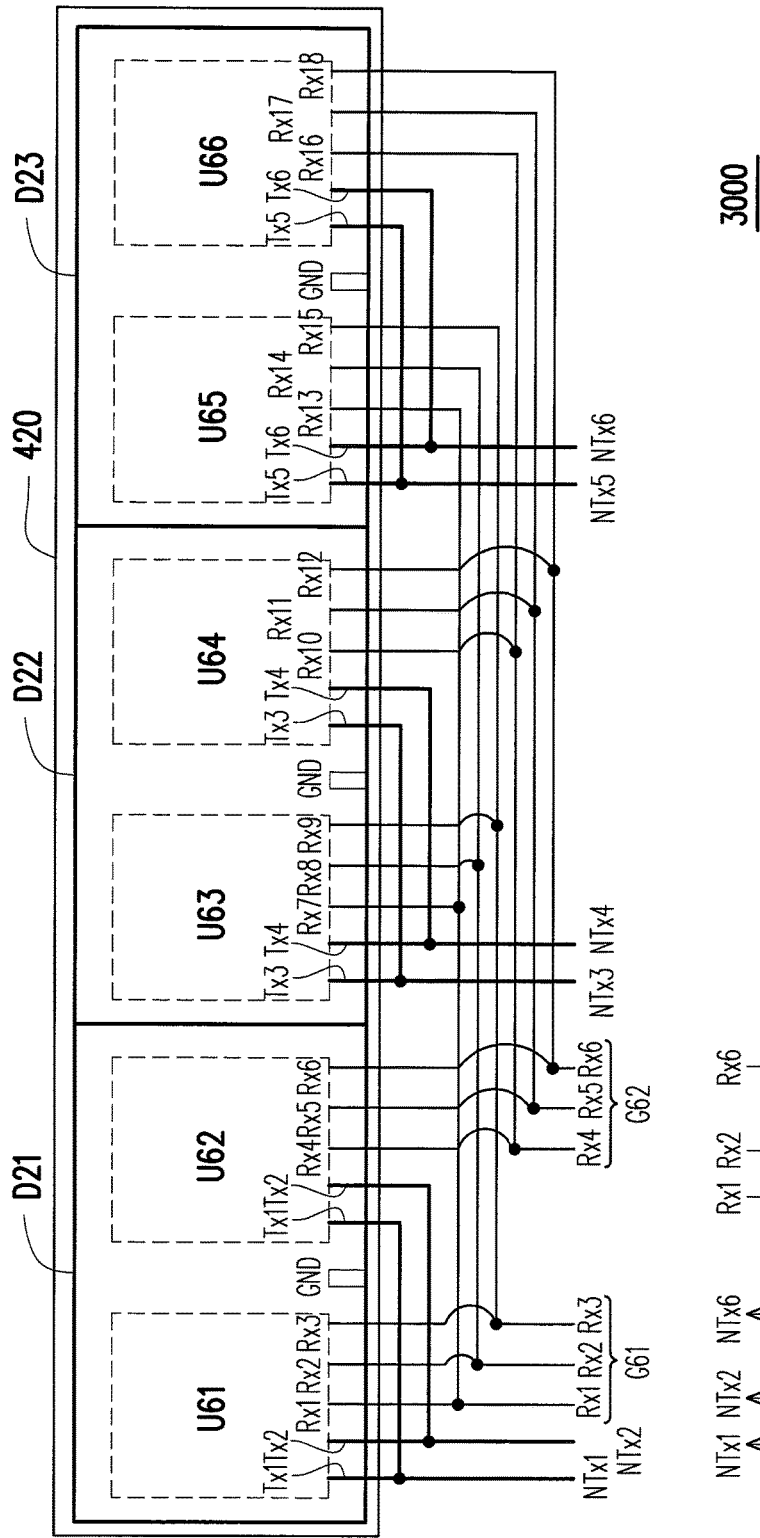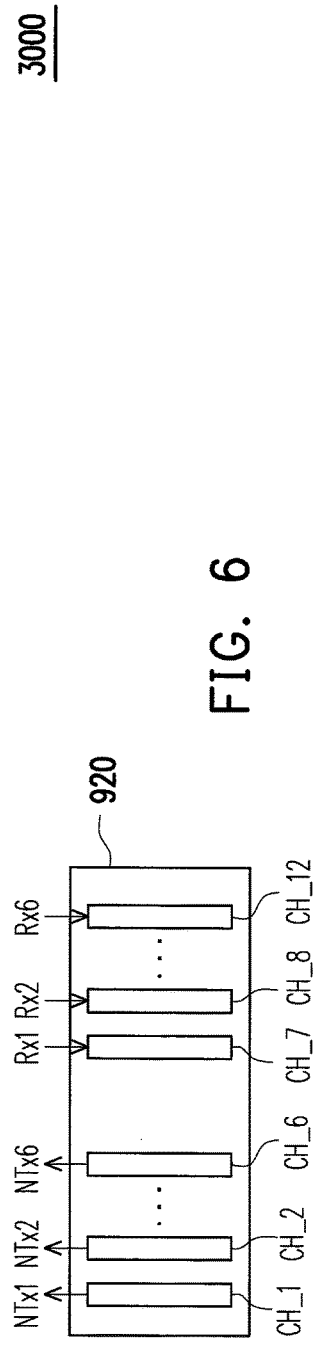
FIG. 6

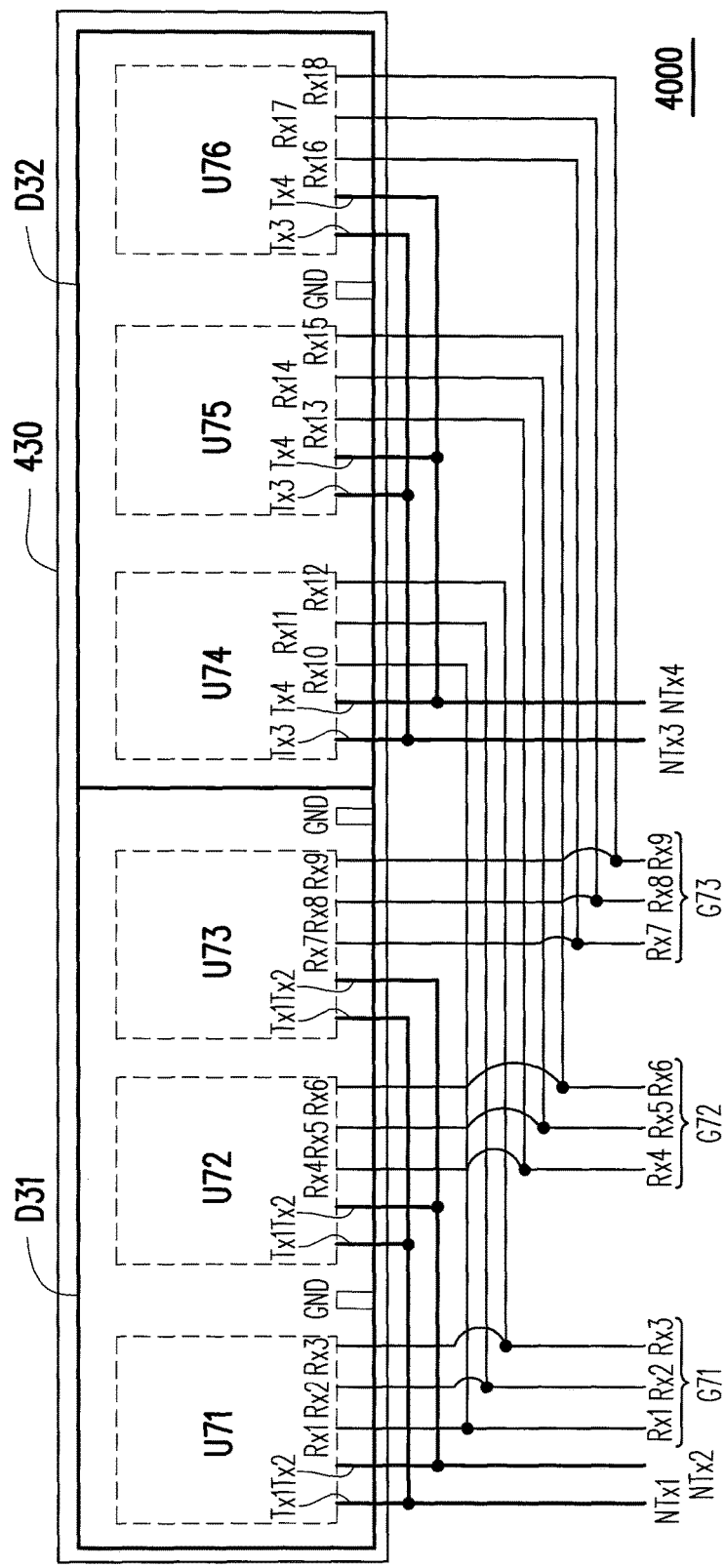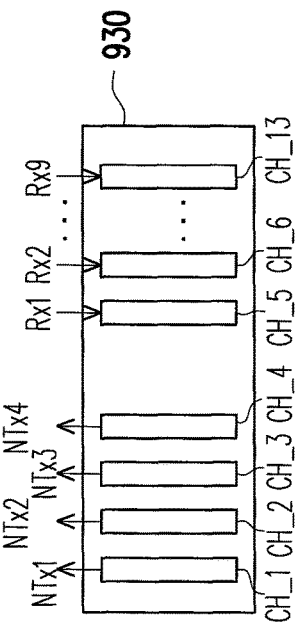
FIG. 7

TOUCH PANEL MODULE AND TOUCH CONTROLLER THEREOF

CROSS-REFERENCE TO RELATED APPLICATION

This application claims the priority benefits of U.S. provisional application Ser. No. 61/988,320, filed on May 5, 2014 and Taiwan application serial no. 103127635, filed on Aug. 12, 2014. The entirety of each of the above-mentioned patent applications is hereby incorporated by reference herein and made a part of this specification.

BACKGROUND OF THE INVENTION

Field of the Invention

The invention relates a panel module and a controller thereof, and more particularly, relates to a touch panel module and a touch controller thereof.

Description of Related Art

Generally, a touch panel includes a plurality of touch electrodes, and each of the touch electrodes may be divided into two parts, which are a driving electrode and a sensing electrode. The driving electrodes and the sensing electrodes may be disposed on the same conductive layer of the touch panel, or may be disposed on different conductive layers of the touch panel. In addition, each of the driving electrodes and each of the sensing electrodes are insulated from each other, and connected to a controller (e.g., a touch controller) through different electrical paths. The controller may include a plurality of signal processing channels for driving each of the driving electrodes and sensing each of the sensing electrodes in order to sense for a capacitance at where each of the touch electrodes in the touch panel is located.

However, as a number of the touch electrodes becomes more, numbers of the driving electrodes to be driven by the controller and the sensing electrodes to be sensed by the controller are also increased. In other words, a number of the signal processing channels of the controller must be increased accordingly. As a result, this will inevitably increase the manufacturing costs of the controller.

SUMMARY OF THE INVENTION

The invention is directed to a touch panel module and a touch controller thereof, and capable of reducing the manufacturing costs of the touch controller.

A touch panel module is proposed according to exemplary embodiments of the invention. The touch panel module includes a touch controller and a touch panel. The touch controller includes a plurality of signal processing channels. The touch panel is electrically connected to the touch controller. The touch panel includes a plurality of first electrodes and a plurality of second electrodes. The first electrodes are electrically connected to the corresponding signal processing channels of the touch controller by using a plurality of first signal routes. The second electrodes are electrically connected to the corresponding signal processing channels of the touch controller by using a plurality of second signal routes. The touch panel is divided into a plurality of areas, and a number of the signal processing channels of the touch controller is determined according to a number of the first signal routes, a number of the second signal routes and a number of the divided areas.

According to an embodiment of the invention, in the touch panel module, the number of the signal processing channels of the touch controller is determined according to a product of a number of the first signal routes in each of the areas and the number of the divided areas and a ratio of the number of the second signal routes of the touch panel to the number of the divided areas.

According to an embodiment of the invention, in the touch panel module, a number of the signal processing channels of the touch controller electrically connected to the first electrodes is determined according to the product of the number of the first signal routes in each of the areas and the number of the divided areas.

According to an embodiment of the invention, in the touch panel module, a number of the signal processing channels of the touch controller electrically connected to the second electrodes is determined according to the ratio of the number of the second signal routes of the touch panel to the number of the divided areas.

According to an embodiment of the invention, in the touch panel module, the number of the first signal routes in each of the areas is M, the number of the second signal routes of the touch panel is N, the number of the divided areas is D, and the number of the signal processing channels of the touch controller is $(N/D)+(M\times D)$. Among them, M, N and D are positive integers.

According to an embodiment of the invention, the touch panel of the touch panel module includes a plurality of touch sensing units. Each of the touch sensing units includes one or more of the first electrodes and one or more of the second electrodes.

According to an embodiment of the invention, in each of the areas of the touch panel module, the first signal routes are electrically connected to the corresponding first electrodes of each of the touch sensing units respectively.

According to an embodiment of the invention, in the touch panel of the touch panel module, the second signal routes are grouped into one or more groups according to a number of the touch sensing units included in each of the areas.

According to an embodiment of the invention, in the touch panel of the touch panel module, each of the groups of the second signal routes is electrically connected to at least one touch sensing unit of the touch sensing units in each of the areas.

According to an embodiment of the invention, in the touch panel module, each of the groups of the second signal routes includes one or more of the second signal routes. In each of the groups of the second signal routes, the one or more of the second signal routes are electrically connected to the corresponding second electrodes of the corresponding touch sensing units respectively.

According to an embodiment of the invention, in the touch panel module, the touch panel determines the number of the divided areas according to the number of the first signal routes and the number of the second signal routes.

According to an embodiment of the invention, in the touch panel module, the number of the divided areas is less than a ratio of a first number to a second number. The first number is a greater one among the number of the first signal routes in each of the areas, e.g. M, and the number of the second signal routes of the touch panel, e.g. N. The second number is a smaller one among the number of the first signal routes in each of the areas and the number of the second signal routes of the touch panel.

According to an embodiment of the invention, in the touch panel module, the number of the second signal routes is greater than the number of the first signal routes, and the touch panel is divided into the areas in an arranging direction of the second electrodes.

According to an embodiment of the invention, in the touch panel module, the first electrodes are selected from one of a driving electrode and a sensing electrode of the touch panel, and the second electrodes are selected from another one of the driving electrode and the sensing electrode of the touch panel.

A touch controller is proposed according to exemplary embodiments of the invention. The touch controller includes a plurality of signal processing channels configured to control a touch panel. The touch panel includes a plurality of first electrodes and a plurality of second electrodes. The first electrodes and the second electrodes are electrically connected to the signal processing channels of the touch controller by using a plurality of first signal routes and a plurality of second signal routes respectively. The touch panel is divided into a plurality of areas. A number of the signal processing channels of the touch controller is determined according to a number of the first signal routes, a number of the second signal routes and a number of the divided areas.

According to an embodiment of the invention, the number of the signal processing channels of the touch controller is determined according to a product of a number of the first signal routes in each of the areas and the number of the divided areas and a ratio of the number of the second signal routes of the touch panel to the number of the divided areas.

According to an embodiment of the invention, a number of the signal processing channels of the touch controller electrically connected to the first electrodes is determined according to the product of the number of the first signal routes in each of the areas and the number of the divided areas.

According to an embodiment of the invention, a number of the signal processing channels of the touch controller electrically connected to the second electrodes is determined according to the ratio of the number of the second signal routes of the touch panel to the number of the divided areas.

In the touch controller according to an embodiment of the invention, the number of the first signal routes in each of the areas is M, the number of the second signal routes of the touch panel is N, the number of the divided areas is D, and the number of the signal processing channels of the touch controller is $(N/D)+(M \times D)$. Among them, M, N and D are positive integers.

In the touch controller according to an embodiment of the invention, the touch panel includes a plurality of touch sensing units, and each of the touch sensing units includes one or more of the first electrodes and one or more of the second electrodes.

In the touch controller according to an embodiment of the invention, in each of the areas, the first signal routes are electrically connected to the corresponding first electrodes of each of the touch sensing units respectively.

In the touch controller according to an embodiment of the invention, in the touch panel, the second signal routes are grouped into one or more groups according to a number of the touch sensing units included in each of the areas.

In the touch controller according to an embodiment of the invention, in the touch panel, each of the groups of the second signal routes is electrically connected to at least one touch sensing unit of the touch sensing units in each of the areas.

In the touch controller according to an embodiment of the invention, each of the groups of the second signal routes includes one or more of the second signal routes. In each of the groups of the second signal routes, the one or more of the second signal routes are electrically connected to the corresponding second electrodes of the corresponding touch sensing units respectively.

In the touch controller according to an embodiment of the invention, the touch panel determines the number of the divided areas according to the number of the first signal routes and the number of the second signal routes.

In the touch controller according to an embodiment of the invention, the number of the divided areas is less than a ratio of a first number to a second number. The first number is a greater one among the number of the first signal routes in each of the areas, e.g. M, and the number of the second signal routes of the touch panel, e.g. N. The second number is a smaller one among the number of the first signal routes in each of the areas and the number of the second signal routes of the touch panel.

In the touch controller according to an embodiment of the invention, the number of the second signal routes is greater than the number of the first signal routes, and the touch panel is divided into the areas in an arranging direction of the second electrodes.

In the touch controller according to an embodiment of the invention, the first electrodes are selected from one of a driving electrode and a sensing electrode of the touch panel, and the second electrodes are selected from another one of the driving electrode and the sensing electrode of the touch panel.

Based on above, in the touch panel module and the touch controller according to the exemplary embodiments of the invention, the touch panel is divided into a plurality of areas, so that the number of the signal processing channels of the touch controller may be determined according to the number of the first signal routes, the number of the second signal routes and the number of the divided areas. Accordingly, the signal processor channels of the touch controller may be reduced to further reduce the manufacturing costs of the touch controller.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5 is a block schematic diagram illustrating a touch panel module according to another embodiment of the invention.

FIG. 6 is a block schematic diagram illustrating a touch panel module according to yet another embodiment of the invention.

FIG. 7 is a block schematic diagram illustrating a touch panel module according to yet another embodiment of the invention.

DESCRIPTION OF THE EMBODIMENTS

Figure 1:
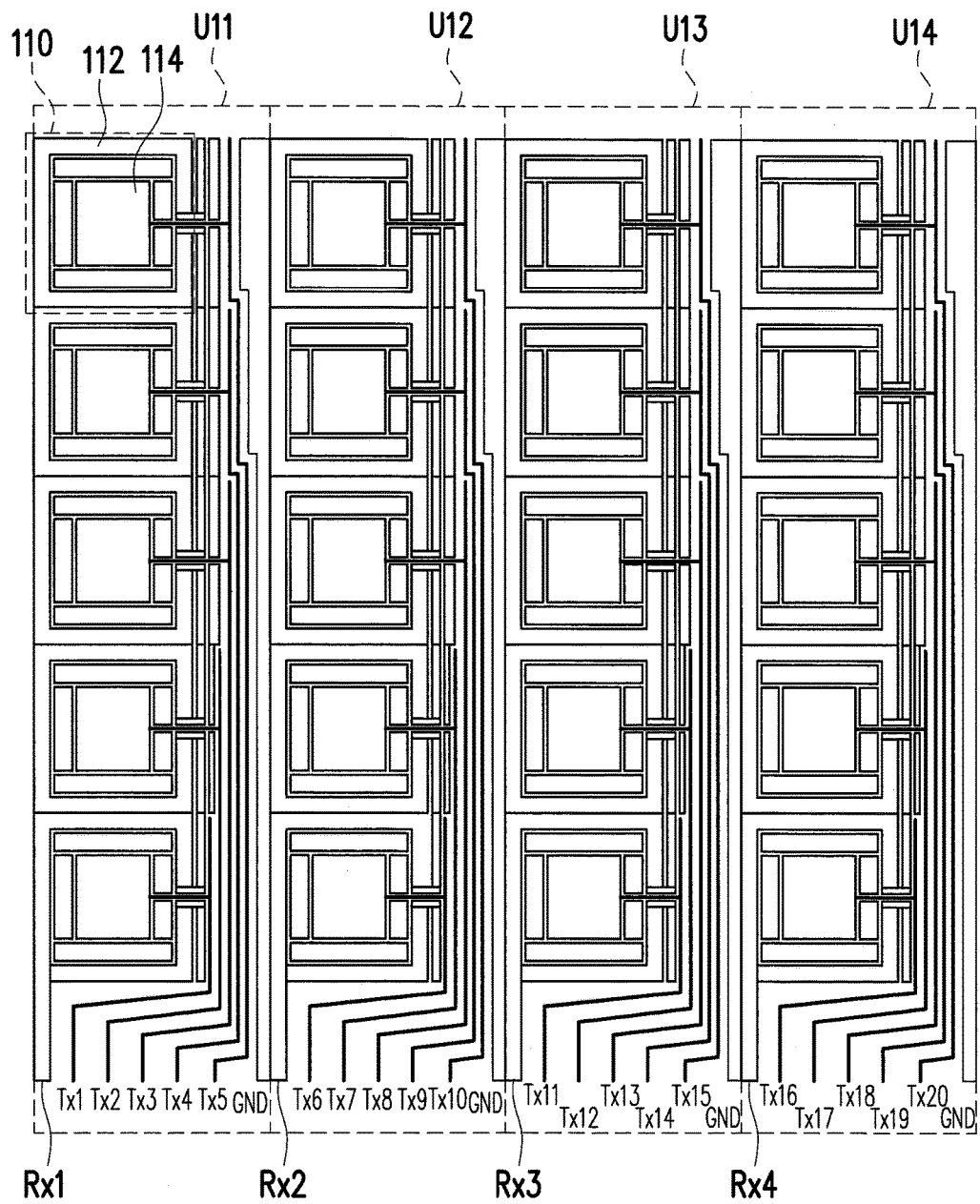
FIG. 1 is a schematic structural view illustrating a layout of a touch panel according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, which is a schematic structural view illustrating a layout of a touch panel 100 according to an embodiment of the invention. As shown in FIG. 1, the touch panel 100 includes four touch sensing units U11 to U14, and each of the touch sensing units U11 to U14 includes five touch electrode units 110. It should be noted that, numbers of the touch sensing units and the touch electrode units are not intended to limit the invention. Each of the touch electrode units 110 includes two parts, which are a first electrode 114 and a second electrode 112. The first electrodes 114 are selected from one of a driving electrode and a sensing electrode of the touch panel 100, and the second electrodes 112 are selected from another one of the driving electrode and the sensing electrode of the touch panel 100. In this example, the first electrode 114 is, for example, the driving electrode, and the second electrode 112 is, for example, the sensing electrode. The second electrodes 112 and the first electrodes 114 are disposed in the same conductive layer of a substrate (not illustrated). The second electrodes 112 and the first electrodes 114 are insulated from each other. In each of the touch electrode units 110, the first electrodes 114 are disposed in a center portion corresponding to the touch electrode unit 110 in squares, and the second electrodes 112 are disposed at circumference of the first electrodes 114. However, shapes and relative positions of the first electrodes and the second electrodes are not particularly limited in the invention. The touch electrode unit 110 may be any transparent conductive materials such as indium-tin oxide (ITO), and so on. The substrate may adopt transparent materials such Polycarbonate (PC), Polyethylene (PE), Polyethylene Terephthalate (PET), PolyMethyl MethAcrylate (PMMA) or glass substrates.

As shown in FIG. 1, in each of the touch sensing units U11 to U14 of the touch panel 100, the second electrodes 112 of the five touch electrode units 110 are electrically connected to one another in a column direction, and electrically connected to a touch controller (not illustrated) by using second signal routes RX1 to RX4. Specifically, in the touch sensing unit U11, the second electrodes 112 of the five touch electrode units 110 are electrically connected to one another in the column direction, and electrically connected to the touch controller by using the second signal route RX1. In the touch sensing unit U12, the second electrodes 112 of the five touch electrode units 110 are electrically connected to one another in the column direction, and electrically connected to the touch controller by using the second signal route RX2. In the touch sensing unit U13, the second electrodes 112 of the five touch electrode units 110 are electrically connected to one another in the column direction, and electrically connected to the touch controller by using the second signal route RX3. In the touch sensing unit U14, the second electrodes 112 of the five touch electrode units 110 are electrically connected to one another in the column direction, and electrically connected to the touch controller by using the second signal route RX4. In each of the touch sensing units U11 to U14, each of the first electrodes 114 of each of the touch electrode units 110 is connected to the touch controller through respective one of first signal branches TX1 to TX20. Specifically, each of the five first electrodes 114 of the touch sensing unit U11 is connected to the touch controller through the respective one of the first signal branches TX1 to TX5. Each of the five first electrodes 114 of the touch sensing unit U12 is connected to the touch controller through the respective one of the first signal branches TX6 to TX10. Each of the five first electrodes 114 of the touch sensing unit U13 is connected to the touch controller through the respective one of the first signal branches TX11 to TX15. Each of the five first electrodes 114 of the touch sensing unit U14 is connected to the touch controller through the respective one of the first signal branches TX16 to TX20.

In the embodiment depicted in FIG. 1, it is illustrated that the touch panel 100 includes twenty of the touch electrode units 110, and the touch panel 100 is implemented in an arranging method of a 5-by-4 electrode array, for example. However, the invention is not limited to the above. The number and the arranging method of the touch electrode units 110 included in the touch panel 100 may be decided based on actual design requirements. In other words, the touch panel may be implemented in the arranging method of a P-by-Q electrode array. Among them, P and Q are positive integers. In this example, the touch panel includes a Q number of touch sensing units, and each of the Q number of touch sensing units includes a P number of touch electrode units. In addition, in view of the embodiment depicted in FIG. 1, it can be known that in this example, the touch panel includes a Q number of the second signal routes and a P-by-Q number of the first signal branches. The second electrodes of the touch panel may be connected to the touch controller by using the second signal routes. The first electrodes of the touch panel may be connected to the touch controller by using the first signal branches.

Figure 2:
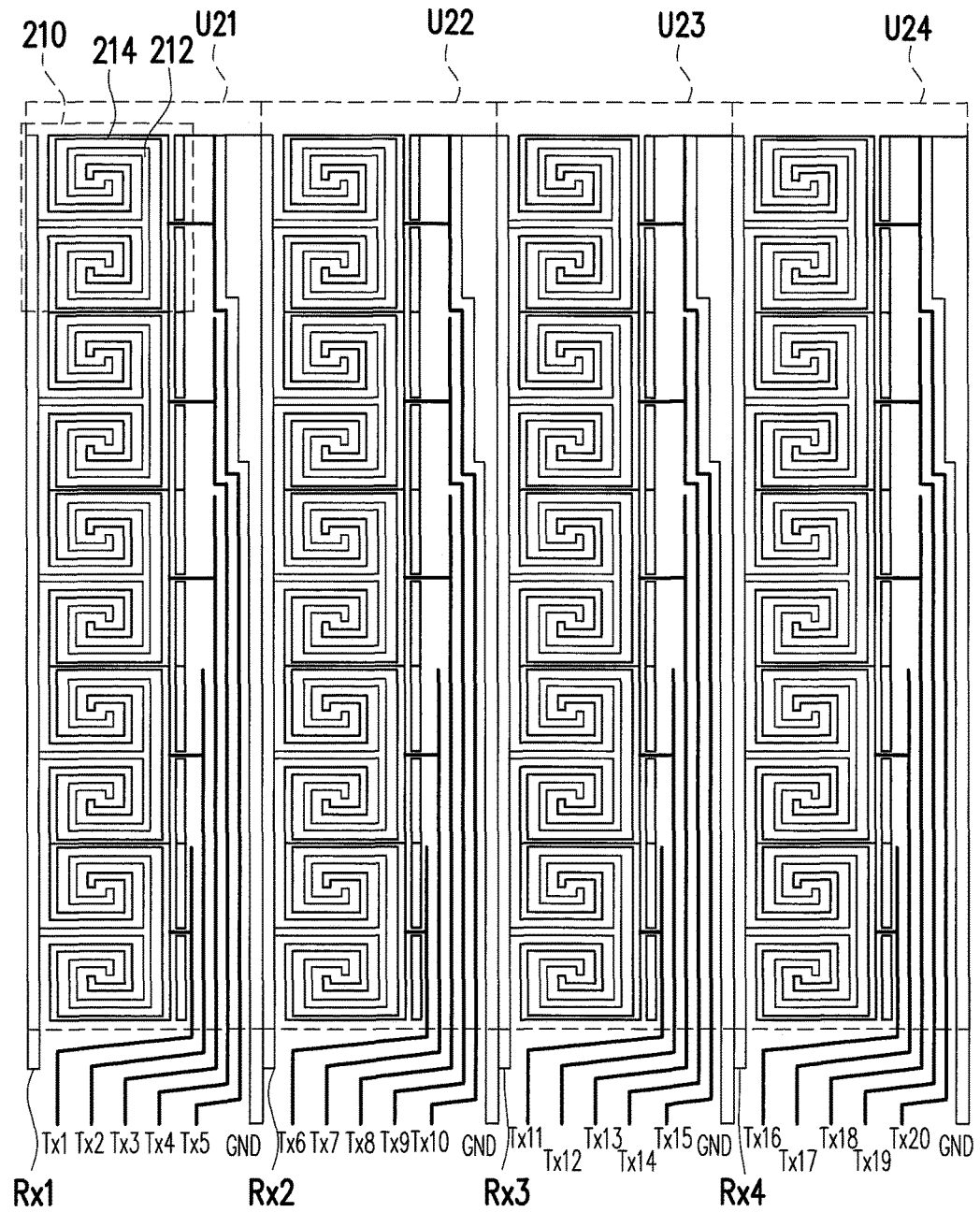
FIG. 2 is a schematic structural view illustrating a layout of a touch panel according to another embodiment of the invention.

Referring to FIG. 2, which is a schematic structural view illustrating a layout of a touch panel 200 according to another embodiment of the invention. As shown in FIG. 2, the touch panel 200 includes four touch sensing units U21 to U24, and each of the touch sensing units U21 to U24 includes five touch electrode units 210. It should be noted that, numbers of the touch sensing units and the touch electrode units are not intended to limit the invention. Each of the touch electrode units 210 includes two parts, which are a first electrode 214 and a second electrode 212. The first electrodes 214 are selected from one of a driving electrode and a sensing electrode of the touch panel 200, and the second electrodes 212 are selected from another one of the driving electrode and the sensing electrode of the touch panel 200. In this example, the first electrode 214 is, for example, the driving electrode, and the second electrode 212 is, for example, the sensing electrode. The second electrodes 212 and the first electrodes 214 are disposed in the same conductive layer of a substrate. The second electrodes 212 and the first electrodes 214 are insulated from each other. In each of the touch electrode units 210, the first electrodes 214 and the second electrodes 212 are surrounding each other in form of spiral, as shown in FIG. 2. However, shapes and relative positions of the first electrodes 214 and the second electrodes 212 are not particularly limited in the invention.

Other implementation details regarding FIG. 2 may refer to related descriptions of FIG. 1, which are not repeated hereinafter.

Similarly, in the embodiment depicted in FIG. 2, it is illustrated that the touch panel 200 includes twenty of the touch electrode units 210, and the touch panel 200 is also implemented in an arranging method of a 5-by-4 electrode array, for example. However, the invention is not limited to the above. The number and the arranging method of the touch electrode units 210 included in the touch panel 200 may be decided based on actual design requirements.

Figure 3:
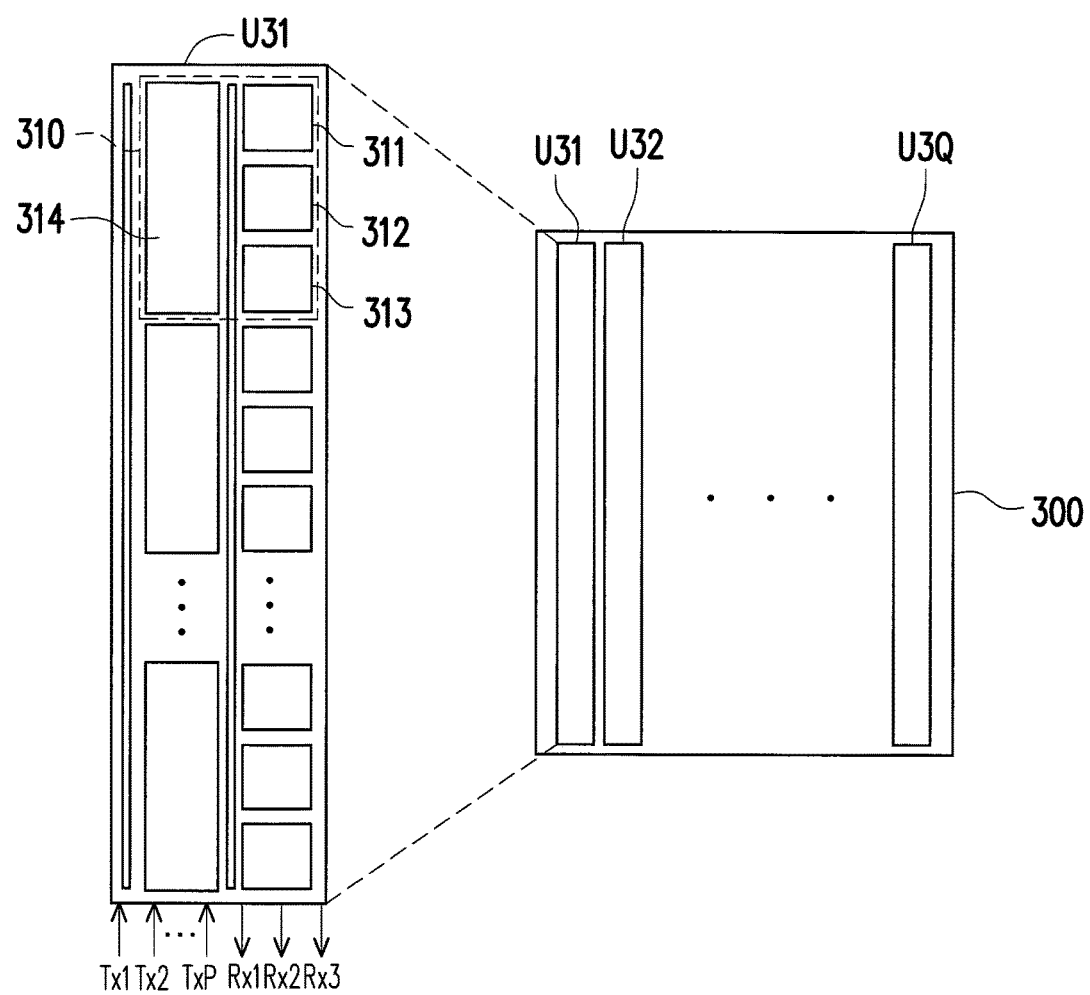
FIG. 3 is a schematic structural view illustrating a layout of a touch panel according to yet another embodiment of the invention.

The following refers to FIG. 3, which is a schematic structural view illustrating a layout of a touch panel 300 according to yet another embodiment of the invention. As shown in FIG. 3, the touch panel 300 includes a Q number of touch sensing units U31 to U3Q, and each of the touch sensing units U31 to U3Q includes a P number of touch electrode units 310. Among them, P and Q are positive integers. Each of the touch electrode units 310 includes four parts, which are one first electrode 314 accompanying with three second electrodes 311 to 313. The first electrodes 314 are selected from one of a driving electrode and a sensing electrode of the touch panel 300, and the second electrodes 311 to 313 are selected from another one of the driving electrode and the sensing electrode of the touch panel 300. In each of the touch electrode units 310, taking cooperation of one driving electrode accompanying with three sensing electrodes as an example, in which the first electrode 314 is, for example, the driving electrode, and the second electrodes 311 to 313 are, for example, the sensing electrode. The second electrodes 311 to 313 and the first electrodes 314 are disposed in the same conductive layer of a substrate (not illustrated). The second electrodes 311 to 313 and the first electrodes 314 are insulated from one another. In each of the touch electrode units 310, the first electrode 314 is disposed at the left side corresponding to the touch electrode unit 310, and the three second electrodes 311 to 313 are disposed at the right side of the first electrode 314 from top to bottom in sequence. In the present embodiment, the first electrodes 314 are disposed in the touch electrode units 310 in rectangles, and the three second electrodes 311 to 313 are sequentially disposed at the right side of the first electrodes 314 in squares, as shown in FIG. 3. However, shapes and relative positions of the first electrodes 314 and the second electrodes 311 to 313 are not particularly limited in the invention. Further, in each of the touch electrode units 310, a number of the second electrodes to which one first electrode is accompanying with is not particularly limited in the invention either. For example, in an embodiment of the invention, one first electrode is accompanying with less than three second electrodes. In another embodiment of the invention, one first electrode is accompanying with more than three second electrodes. Materials of the touch electrode unit 310 and the substrate may refer to related descriptions of FIG. 1, which are not repeated hereinafter.

As shown in FIG. 3, in each of the touch sensing units U31 to U3Q of the touch panel 300, the corresponding second electrodes of the P number of the touch electrode units 310 are electrically connected to one another in a column direction, and electrically connected to a touch controller (not illustrated) by using second signal routes RX1 to RX3. For instance, in the touch sensing unit U31, the second electrodes 311 of the P number of the touch electrode units 310 are electrically connected to one another in the column direction, and connected to the touch controller by using the second signal route RX1. The second electrodes 312 of the P number of the touch electrode units 310 are electrically connected to one another in the column direction, and electrically connected to the touch controller by using the second signal route RX2. The second electrodes 313 of the P number of the touch electrode units 310 are electrically connected to one another in the column direction, and electrically connected to the touch controller by using the third signal route RX3. Connecting methods of the second electrodes of the rest of the touch sensing units U32 to U3Q may be inferred by reference with the foregoing description. In each of the touch sensing units U31 to U3Q, each of the first electrodes 314 of each of the touch electrode units 310 is connected to the touch controller through respective one of first signal branches. For example, in the touch sensing unit U31, each of the first electrodes 314 of the P number of the touch electrode units 310 is connected to the touch controller by using the respective one of first signal branches TX1 to TXP. Connecting methods of the first electrodes of the rest of the touch sensing units U32 to U3Q may be inferred by reference with the foregoing description. The number and the arranging method of the touch electrode units 310 included in the touch panel 300 depicted in FIG. 3 may be decided based on actual design requirements.

Figure 4:
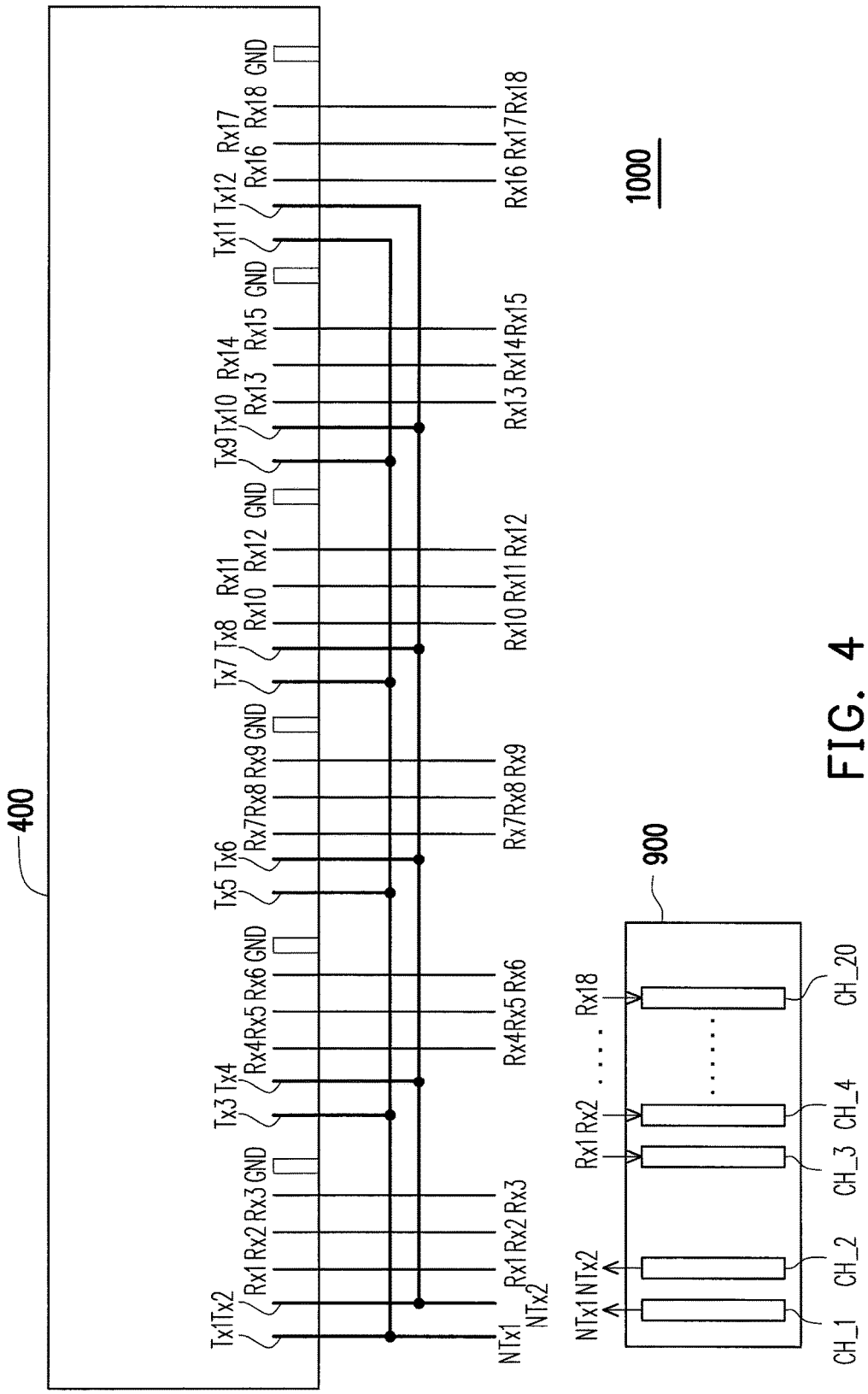
FIG. 4 is a block schematic diagram illustrating a touch panel module according to an embodiment of the invention.

The following refers to FIG. 4, which is a block schematic diagram illustrating a touch panel module 1000 according to an embodiment of the invention. The touch panel module 1000 includes a touch panel 400 and a touch controller 900. The touch panel 400 is electrically connected to the touch controller 900. The touch panel 400 includes a plurality of first electrodes (not illustrated) and a plurality of second electrodes (not illustrated). In the present embodiment, a layout structure of the touch panel 400 may be identical to those shown in FIG. 1 to FIG. 3 for example, which is not particularly limited in the invention. The touch controller 900 includes a plurality of signal processing channels CH_1 to CH_20. The signal processing channels CH_1 to CH_20 are configured to drive one of the first electrode and the second electrode in the touch panel 400 served as the driving electrode, and to sense a capacitance at where another one of the first electrode and the second electrode in the touch panel 400 served as the sensing electrode is located. The touch controller 900 may be disposed on a substrate of the touch panel 400 by using a chip on glass (COG) process; or may be disposed on a flexible printed circuit (FPC) by using a chip on film (COF) process; or may also be disposed on a printed circuit board (PCB) by using a chip on board (COB) process. However, the invention is not limited to the above. The touch panel 400 depicted in FIG. 4 may be one of the touch panels 100, 200 and 300 respectively depicted in FIG. 1, FIG. 2 and FIG. 3, and thus implementation details of the touch panel 400 depicted in FIG. 4 may refer to the related descriptions of FIGS. 1 to 3, which are not repeated hereafter. However, the invention is not limited to the above.

In the present embodiment, the touch panel 400 includes a plurality of first signal branches TX1 to TX12 and a plurality of second signal routes RX1 to RX18. As similar to the foregoing descriptions regarding FIG. 1, FIG. 2 and FIG. 3, the first signal branches TX1 to TX12 of the touch panel 400 are configured to connect aforesaid first electrodes of the touch panel 400 to the touch controller 900, and the second signal routes RX1 to RX18 are configured to connect aforesaid second electrodes of the touch panel 400 to the touch controller 900. In this example, the touch panel 400 is not yet divided into areas. However, from another perspective, it may also be regarded as being divided into one area (i.e., a number D of the divided areas is equal to 1). In order to reduce a number of the signal processing channels of the touch controller 900, the first electrodes of the touch panel 400 are electrically connected to the corresponding signal processing channels CH_1 and CH_2 of the touch controller 900 by using the first signal branches TX1 to TX12 respectively. Specifically, in the touch panel 400, a part of the first electrodes is connected to the corresponding signal processing channel CH_1 of the touch controller 900 by using the odd-numbered first signal branches TX1, TX3, TX5, TX7, TX9 and TX11. These first signal branches TX1, TX3, TX5, TX7, TX9 and TX11 are electrically connected to one another to form a first signal route NTX1. Another part of the first electrodes is connected to the corresponding signal processing channel CH_2 of the touch controller 900 by using the even-numbered first signal branches TX2, TX4, TX6, TX8, TX10 and TX12. These first signal branches TX2, TX4, TX6, TX8, TX10 and TX12 are electrically connected to one another to form a first signal route NTX2. In other words, in this example, there are substantially two of the first signal routes for connecting the first electrodes to the signal processing channels CH_1 and CH_2 (i.e., a number M of the first signal routes is equal to 2). On the other hand, the second electrodes of the touch panel 400 are connected to the corresponding signal processing channels CH_3 to CH_20 of the touch controller 900 by using the second signal routes RX1 to RX18 respectively. In other words, in this example, there are substantially eighteen of the second signal routes for connecting the second electrodes to the signal processing channels CH_3 and CH_20 (i.e., a number N of the second signal routes of the touch panel 400 is equal to 18). Accordingly, by using a connecting method for the first signal routes and the second signal routes of the touch panel module 1000 depicted in FIG. 4, the touch controller 900 only requires use of twenty signal processing channels CH_1 to CH_20 for driving and sensing the touch panel 400. In other words, the number of the signal processing channels CH_1 to CH_20 of the touch controller 900 may be expressed by a parametric equation: (N/D)+(M×D). Therefore, in the present embodiment, the number of the signal processing channels CH_1 to CH_20 of the touch controller 900 is determined according to the number of the first signal routes, the number of the second signal routes and the number of the divided areas on the touch panel 400. It should be noted that, in the present embodiment, the number of the divided areas and the numbers of the signal routes and the signal processing channels are only illustrative instead of limiting the invention.

In an embodiment of the invention, another touch panel and another touch controller are provided, and capable of further reducing the number of the signal processing channels required by the touch controller 900 in the embodiment of FIG. 4. The following refers to FIG. 5, which is a block schematic diagram illustrating a touch panel module 2000 according to another embodiment of the invention. The touch panel module 2000 includes a touch panel 410 and a touch controller 910. The touch panel 410 includes a plurality of first electrodes (not illustrated) and a plurality of second electrodes (not illustrated). In the present embodiment, a layout structure of the touch panel 410 may be identical to those shown in FIG. 1 to FIG. 3 for example, which is not particularly limited in the invention. The touch controller 910 includes a plurality of signal processing channels CH_1 to CH_15 configured to control the touch panel 410. The signal processing channels CH_1 to CH_15 are configured to drive one of the first electrode and the second electrode in the touch panel 410 served as the driving electrode, and to sense a capacitance at where another one of the first electrode and the second electrode in the touch panel 410 served as the sensing electrode is located. In the present embodiment, a layout structure of the touch panel 410 may be identical to those shown in FIG. 1 to FIG. 3 for example, which is not particularly limited in the invention.

Referring back to FIG. 5, the touch panel 410 includes a plurality of first signal branches TX1 to TX12 and a plurality of second signal routes RX1 to RX18. As similar to the foregoing descriptions regarding FIG. 1, FIG. 2 and FIG. 3, the first signal branches TX1 to TX12 of the touch panel 410 are configured to connect aforesaid first electrodes of the touch panel 410 to the touch controller 910, and the second signal routes RX1 to RX18 are configured to connect aforesaid second electrodes of the touch panel 410 to the touch controller 910. Herein, the touch panel 410 is divided into a plurality of areas (e.g., six areas D11 to D16 depicted in FIG. 5). Accordingly, the number D of the divided areas is equal to 6 in this example. Each of the areas D11 to D16 includes two first signal branches and three second signal routes. For instance, the area D11 includes two first signal branches TX1 and TX2 and three second signal routes RX1 to RX3. The rest of the areas D12 to D16 can be inferred from the above. In other words, in this example, there are substantially two of the first signal routes NTX1 and NTX2 (i.e., the signal branches TX1 and TX2) for connecting the first electrodes to the signal processing channels CH_1 and CH_2 (i.e., a number M of the first signal routes is equal to 2). The first electrodes of the touch panel 410 are connected to the corresponding signal processing channels CH_1 to CH_12 of the touch controller 910 by using the first signal routes NTX1 to NTX12 respectively. Specifically, in the touch panel 410, a part of the first electrodes is connected to the corresponding signal processing channel CH_1 of the touch controller 910 by using the first signal route NTX1. A part of the first electrodes is connected to the corresponding signal processing channel CH_2 of the touch controller 910 by using the first signal route NTX2. Connections for the rest of the first electrodes can be inferred from the above. In other words, in this example, the number M of the first signal routes in each of the areas D11 to D16 is equal to 2. In the present embodiment, a number of the signal processing channels CH_1 to CH_12 of the touch controller 910 electrically connected to the first electrodes is determined according to the product of the number M (i.e., 2) of the first signal routes in each of the areas and the number D (i.e., 6) of the divided areas. That is, the number of the signal processing channels CH_1 to CH_12 is M×D=12.

On the other hand, the second electrodes of the touch panel 410 are connected to the corresponding signal processing channels CH_13 to CH_15 of the touch controller 910 by using the second signal routes RX1 to RX18 respectively. Specifically, in the touch panel 410, a first part of the second electrodes is connected to the corresponding signal processing channel CH_13 of the touch controller 910 by using the second signal routes RX1, RX4, RX7, RX10, RX13 and RX16. In this example, the second signal routes RX1, RX4, RX7, RX10, RX13 and RX16 are electrically connected to one another and connected to the corresponding signal processing channel CH_13 of the touch controller 910 through the second signal route RX1. However, the invention is not limited thereto. For example, the second signal routes RX1, RX4, RX7, RX10, RX13 and RX16 may also be electrically connected to one another and connected to the corresponding signal processing channel CH_13 of the touch controller 910 through one of the second signal routes RX4, RX7, RX10, RX13 and RX16. A second part of the second electrodes is connected to the corresponding signal processing channel CH_14 of the touch controller 910 by using the second signal routes RX2, RX5, RX8, RX11, RX14 and RX17. In this example, the second signal routes RX2, RX5, RX8, RX11, RX14 and RX17 are electrically connected to one another and connected to the corresponding signal processing channel CH_14 of the touch controller 910 through the second signal route RX2. However, the invention is not limited thereto. For example, the second signal routes RX2, RX5, RX8, RX11, RX14 and RX17 may also be electrically connected to one another and connected to the corresponding signal processing channel CH_14 of the touch controller 910 through one of the second signal routes RX5, RX8, RX11, RX14 and RX17. A third part of the second electrodes is connected to the corresponding signal processing channel CH_15 of the touch controller 910 by using the second signal routes RX3, RX6, RX9, RX12, RX15 and RX18. In this example, the second signal routes RX3, RX6, RX9, RX12, RX15 and RX18 are electrically connected to one another and connected to the corresponding signal processing channel CH_15 of the touch controller 910 through the second signal route RX3. However, the invention is not limited thereto. For example, the second signal routes RX3, RX6, RX9, RX12, RX15 and RX18 may also be electrically connected to one another and connected to the corresponding signal processing channel CH_15 of the touch controller 910 through one of the second signal routes RX6, RX9, RX12, RX15 and RX18. Accordingly, by using an area division method and a signal routing method for the touch panel 410 of the touch panel module 2000 depicted in FIG. 5, the touch controller 910 only requires use of the fifteen signal processing channels CH_1 to CH_15 for driving and sensing the touch panel 410.

Overall, the number (15) of the signal processing channels CH_1 to CH_15 required by the touch controller 910 depicted in FIG. 5 may be determined according to the number (12) of the first signal routes NTX1 to NTX12, the number (18) of the second signal routes RX1 to RX18 and the number (6) of the divided areas D11 to D16 in FIG. 5.

In the foregoing embodiment, the number of the signal processing channels CH_1 to CH_15 required by the touch controller 910 depicted in FIG. 5 may also be specifically determined according to the product of the number of the first signal routes in each of the areas D11 to D16 (e.g., the first signal routes NTX1 and NTX2 in the area D11) and the number of the divided areas D11 to D16 plus a ratio of the number of the second signal routes RX1 to RX18 of the touch panel 410 to the number of the divided areas D11 to D16 depicted in FIG. 5. Specifically, in view of FIG. 5, the number of the first signal routes in each of the areas D11 to D16 (e.g., the first signal routes NTX1 and NTX2 of the area D11) is 2, the number of the divided areas of the touch panel 410 is 6, and the number of the second signal routes RX1 to RX18 of the touch panel 410 is 18. Therefore, the number (15) of the signal processing channels CH_1 to CH_15 required by the touch controller 910 of FIG. 5 may be determined according to the product of 2 and 6 and the ratio of 18 to 6.

More specifically, in the foregoing embodiment, the number (12) of the signal processing channels CH_1 to CH_12 of the touch controller 910 of FIG. 5 electrically connected to the first electrodes is determined according to the product of the number (2) of the first signal routes in each of the areas (e.g., the first signal routes NTX1 and NTX2 of the area D11) and the number (6) of the divided areas D11 to D16.

Furthermore, in the foregoing embodiment, the number (3) of the signal processing channels CH_13 to CH_15 of the touch controller 910 of FIG. 5 electrically connected to the second electrodes is determined according to the ratio of the number (18) of the second signal routes RX1 to RX18 of the touch panel 400 to the number (6) of the divided areas D11 to D16.

In the foregoing embodiment, although the embodiment of FIG. 5 divides the touch panel 400 of FIG. 4 into the six areas D11 to D16 in which the number of the first signal routes in each of the areas is 2 and the number of the second signal routes of the touch panel 400 is 18, but the invention is not limited thereto. In other words, the touch panel 400 of FIG. 4 may also be divided into a D number of areas, and the number of the first signal routes in each of the areas may be M, and the number of the second signal routes of the touch panel 400 may be N. Among them, M, N and D are positive integers. Accordingly, it can be inferred from the related descriptions of the embodiment of FIG. 5 that, after the touch panel 400 is divided into the D number of areas, the number of the signal processing channels required by the touch controller 900 of such touch panel module is (N/D)+(M×D).

In the foregoing embodiment, the touch panel 410 of FIG. 5 includes six touch sensing units U51 to U56, and each of the touch sensing units U51 to U56 includes one or more of the first electrodes and one or more of the second electrodes.

In the foregoing embodiment, in each of the areas D11 to D16 of FIG. 5, the first signal routes NTX1 to NTX12 are electrically connected to the corresponding first electrodes of each of the touch sensing units U51 to U56 respectively. For instance, in the area D11, the first signal route NTX1 is electrically connected to the corresponding first electrodes of the touch sensing unit U51, and the first signal route NTX2 is electrically connected to the corresponding first electrodes of the touch sensing unit U51. Related details regarding the first signal route and the corresponding first electrode to be connected may refer to the same in FIG. 1, FIG. 2 and FIG. 3, which are not repeated hereinafter.

In the foregoing embodiment, the second signal routes RX1 to RX18 of the touch panel 400 are grouped into one or more groups according to a number of the touch sensing units U51 to U56 included in each of the areas D11 to D16. For instance, each of the areas D11 to D16 of FIG. 5 includes one of the corresponding touch sensing units U51 to U56, and thus the second signal routes RX1 to RX18 are grouped into one group G51. Further, in the touch panel 400, the group G51 of the second signal routes is electrically connected the corresponding touch sensing units U51 to U56 in each of the areas D11 to D16. The group G51 of the second signal routes of FIG. 5 includes the second signal routes RX1 to RX18. In the group G51 of the second signal routes, the second signal routes RX1, RX4, RX7, RX10, RX13 and RX16 are electrically connected to one another and connected to the corresponding second electrodes of the corresponding touch sensing units U51 to U56. In the group G51 of the second signal routes, the second signal routes RX2, RX5, RX8, RX11, RX14 and RX17 are electrically connected to one another and connected to the corresponding second electrodes of the corresponding touch sensing units U51 to U56. In the group G51 of the second signal routes, the second signal routes RX3, RX6, RX9, RX12, RX15 and RX18 are electrically connected to one another and connected to the corresponding second electrodes of the corresponding touch sensing units U51 to U56.

The following refers to FIG. 6, which is a block schematic diagram illustrating a touch panel module 3000 according to yet another embodiment of the invention. The touch panel module 3000 includes a touch panel 420 and a touch controller 920. The touch panel 420 includes a plurality of first electrodes (not illustrated) and a plurality of second electrodes (not illustrated). In the present embodiment, a layout structure of the touch panel 420 may be identical to those shown in FIG. 1 to FIG. 3 for example, which is not particularly limited in the invention. The touch controller 920 includes a plurality of signal processing channels CH_1 to CH_12 configured to control the touch panel 420. The signal processing channels CH_1 to CH_12 are configured to drive one of the first electrode and the second electrode in the touch panel 420 served as the driving electrode, and to sense a capacitance at where another one of the first electrode and the second electrode in the touch panel 420 served as the sensing electrode is located. In the present embodiment, a layout structure of the touch panel 420 may be identical to those shown in FIG. 1 to FIG. 3 for example, which is not particularly limited in the invention.

Referring back to FIG. 6, the touch panel 420 includes two sets of first signal branches TX1 to TX6 and a plurality of second signal routes RX1 to RX18. As similar to the foregoing descriptions regarding FIG. 1, FIG. 2 and FIG. 3, the two sets of the first signal branches TX1 to TX6 of the touch panel 420 are configured to connect aforesaid first electrodes of the touch panel 420 to the touch controller 920, and the second signal routes RX1 to RX18 are configured to connect aforesaid second electrodes of the touch panel 420 to the touch controller 920. Herein, the touch panel 420 is divided into a plurality of areas (e.g., three areas D21 to D23 depicted in FIG. 6). Accordingly, the number D of the divided areas is equal to 3 in this example. Each of the areas D21 to D23 includes two sets of the first signal branches and six second signal routes. For instance, the area D21 includes two sets of the first signal branches TX1 to TX2 and six second signal routes RX1 to RX6. Among them, the first signal branches TX1 in the two sets are electrically connected to each other to form a first signal route NTX1, and the first signal branches TX2 in the two sets are electrically connected to each other to form a first signal route NTX2. The rest of the areas D22 and D23 can be inferred from the above. In other words, in this example, there are substantially two of the first signal routes for connecting the first electrodes to the signal processing channels CH_1 and CH_2 (i.e., a number M of the first signal routes is equal to 2). The first electrodes of the touch panel 420 may be electrically connected to the corresponding signal processing channels CH_1 to CH_6 of the touch controller 920 by using the first signal routes NTX1 to NTX6 respectively. Specifically, in the area D21 of the touch panel 420, a part of the first electrodes is electrically connected to the corresponding signal processing channel CH_1 of the touch controller 920 by using the first signal route NTX1. A part of the first electrodes is electrically connected to the corresponding signal processing channel CH_2 of the touch controller 920 by using the first signal route NTX2. In the area D22 of the touch panel 420, a part of the first electrodes is electrically connected to the corresponding signal processing channel CH_3 of the touch controller 920 by using the first signal route NTX3. A part of the first electrodes is electrically connected to the corresponding signal processing channel CH_4 of the touch controller 920 by using the first signal route NTX4. In the area D23 of the touch panel 420, a part of the first electrodes is electrically connected to the corresponding signal processing channel CH_5 of the touch controller 920 by using the first signal route NTX5. A part of the first electrodes is electrically connected to the corresponding signal processing channel CH_6 of the touch controller 920 by using the first signal route NTX6. In other words, in this example, the number M of the first signal routes in each of the areas D21 to D23 is equal to 2. In the present embodiment, a number of the signal processing channels CH_1 to CH_6 of the touch controller 920 electrically connected to the first electrodes is determined according to the product of the number M (i.e., 2) of the first signal routes in each of the areas and the number D (i.e., 3) of the divided areas. That is, the number of the signal processing channels CH_1 to CH_6 is M×D=6.

On the other hand, the second electrodes of the touch panel 420 are electrically connected to the corresponding signal processing channels CH_7 to CH_12 of the touch controller 920 by using the second signal routes RX1 to RX18 respectively. Specifically, in the touch panel 420, a first part of the second electrodes is electrically connected to the corresponding signal processing channel CH_7 of the touch controller 920 by using the second signal routes RX1, RX7, and RX13. In this example, the second signal routes RX1, RX7 and RX13 are electrically connected to one another and connected to the corresponding signal processing channel CH_7 of the touch controller 920 through the second signal route RX1. However, the invention is not limited thereto. For example, the second signal routes RX1, RX7 and RX13 may also be electrically connected to one another and connected to the corresponding signal processing channel CH_7 of the touch controller 920 through one of the second signal routes RX7 and RX13. A second part of the second electrodes is electrically connected to the corresponding signal processing channel CH_8 of the touch controller 920 by using the second signal routes RX2, RX8 and RX14. In this example, the second signal routes RX2, RX8 and RX14 are electrically connected to one another and connected to the corresponding signal processing channel CH_8 of the touch controller 920 through the second signal route RX2. However, the invention is not limited thereto. For example, the second signal routes RX2, RX8 and RX14 may also be electrically connected to one another and connected to the corresponding signal processing channel CH_8 of the touch controller 920 through one of the second signal routes RX8 and RX14. A third part of the second electrodes is electrically connected to the corresponding signal processing channel CH_9 of the touch controller 920 by using the second signal routes RX3, RX9 and RX15. In this example, the second signal routes RX3, RX9 and RX15 are electrically connected to one another and connected to the corresponding signal processing channel CH_9 of the touch controller 920 through the second signal route RX3. However, the invention is not limited thereto. For example, the second signal routes RX3, RX9 and RX15 may also be electrically connected to one another and connected to the corresponding signal processing channel CH_9 of the touch controller 920 through one of the second signal routes RX9 and RX15. Electrical connections between the rest of the second electrodes and the other signal processing channels may be inferred by reference with the foregoing description. Accordingly, by using an area division method and a signal routing method for the touch panel 420 of the touch panel module 3000 depicted in FIG. 6, the touch controller 920 only requires use of the twelve signal processing channels CH_1 to CH_12 for driving and sensing the touch panel 420.

Overall, the number (12) of the signal processing channels CH_1 to CH_12 required by the touch controller 920 depicted in FIG. 6 may be determined according to the number (6) of the first signal routes NTX1 to NTX6, the number (18) of the second signal routes RX1 to RX18 and the number (3) of the divided areas D21 to D23.

In the foregoing embodiment, the number of the signal processing channels CH_1 to CH_12 required by the touch controller 920 of FIG. 6 may also be specifically determined according to the product of the number of the first signal routes in each of the areas D21 to D23 (e.g., the first signal routes NTX1 and NTX2 in the area D21) and the number of the divided areas D21 to D23 plus the ratio of the number of the second signal routes RX1 to RX18 of the touch panel 420 to the number of the divided areas D21 to D23. Specifically, in view of FIG. 6, the number of the first signal routes in each of the areas D21 to D23 (e.g., the first signal routes NTX1 and NTX2 of the area D21) is 2, the number of the divided areas of the touch panel 420 is 3, and the number of the second signal routes RX1 to RX18 of the touch panel 420 is 18. Therefore, the number (12) of the signal processing channels CH_1 to CH_12 required by the touch controller 920 may be determined according to the product of 2 and 3 and the ratio of 18 to 3.

More specifically, in the foregoing embodiment, the number (6) of the signal processing channels CH_1 to CH_6 of the touch controller 920 of FIG. 6 electrically connected to the first electrodes is determined according to the product of the number (2) of the first signal routes in each of the areas (e.g., the first signal routes NTX1 and NTX2 of the area D21) and the number (3) of the divided areas D21 to D23.

Furthermore, in the foregoing embodiment, the number (6) of the signal processing channels CH_7 to CH_12 of the touch controller 920 of FIG. 6 electrically connected to the second electrodes is determined according to the ratio of the number (18) of the second signal routes RX1 to RX18 of the touch panel 420 to the number (3) of the divided areas D21 to D23.

In the foregoing embodiment, although the embodiment of FIG. 6 divides the touch panel 400 of FIG. 4 into the three areas D21 to D23 in which the number of the first signal routes in each of the areas is 2 and the number of the second signal routes of the touch panel 400 is 18, but the invention is not limited thereto. In other words, the touch panel 400 may also be divided into a D number of areas, and the number of the first signal routes in each of the areas may be M, and the number of the second signal routes of the touch panel 400 may be N. Among them, M, N and D are positive integers. Accordingly, it can be inferred from the related descriptions of the embodiment of FIG. 6 that, the number of the signal processing channels required by the touch controller 920 is (N/D)+(M×D).

In the foregoing embodiment, the touch panel 420 of FIG. 6 includes six touch sensing units U61 to U66, and each of the touch sensing units U61 to U66 includes one or more of the first electrodes and one or more of the second electrodes.

In the foregoing embodiment, in each of the areas D21 to D23 of FIG. 6, the first signal routes NTX1 to NTX6 are electrically connected to the corresponding first electrodes of each of the touch sensing units U61 to U66 respectively. For instance, in the area D21, the first signal route NTX1 is electrically connected to the corresponding first electrodes of the touch sensing units U61 and U62, and the first signal route NTX2 is electrically connected to the corresponding first electrodes of the touch sensing units U61 and U62. Details regarding the first signal route and the corresponding first electrodes may refer to the same in FIG. 1, FIG. 2 and FIG. 3, which are not repeated hereinafter.

In the foregoing embodiment, the second signal routes RX1 to RX18 of the touch panel 420 are grouped into one or more groups according to a number of the touch sensing units U61 to U66 included in each of the areas D21 to D23. For instance, the area D21 of FIG. 6 includes two corresponding touch sensing units U61 and U62, and thus the second signal routes RX1 to RX18 are grouped into two groups G61 and G62. Further, in the touch panel 420, the group G61 of the second signal routes is electrically connected the corresponding touch sensing units U61, U63 and U65 in each of the areas D21 to D23. The group G62 of the second signal routes is electrically connected the corresponding touch sensing units U62, U64 and U66 in each of the areas D21 to D23. Furthermore, each of the groups G61 and G62 of the second signal routes includes one or more of the second signal routes RX1 to RX18. In each of the groups G61 and G62 of the second signal routes, the one or more of the second signal routes are electrically connected to the corresponding second electrodes of the corresponding touch sensing units U61 to U66 respectively. For instance, the group G61 of the second signal routes includes the second signal routes RX1 to RX3, RX7 to RX9 and RX13 to RX15, and the group G62 of the second signal routes includes the second signal routes RX4 to RX6, RX10 to RX12 and RX16 to RX18. In the group G61 of the second signal routes, the second signal routes RX1, RX7 and RX13 are electrically connected to one another and connected to the corresponding second electrodes of the corresponding touch sensing units U61, U63 and U65. In the group G61 of the second signal routes, the second signal routes RX2, RX8 and RX14 are electrically connected to one another and connected to the corresponding second electrodes of the corresponding touch sensing units U61, U63 and U65. In the group G61 of the second signal routes, the second signal routes RX3, RX9 and RX15 are electrically connected to one another and connected to the corresponding second electrodes of the corresponding touch sensing units U61, U63 and U65. In the group G62 of the second signal routes, the second signal routes RX4, RX10 and RX16 are electrically connected to one another and connected to the corresponding second electrodes of the corresponding touch sensing units U62, U64 and U66. In the group G62 of the second signal routes, the second signal routes RX5, RX11 and RX17 are electrically connected to one another and connected to the corresponding second electrodes of the corresponding touch sensing units U62, U64 and U66. In the group G62 of the second signal routes, the second signal routes RX6, RX12 and RX18 are electrically connected to one another and connected to the corresponding second electrodes of the corresponding touch sensing units U62, U64 and U66.

The following refers to FIG. 7, which is a block schematic diagram illustrating a touch panel module 4000 according to yet another embodiment of the invention. The touch panel module 4000 includes a touch panel 430 and a touch controller 930. The touch panel 430 includes a plurality of first electrodes (not illustrated) and a plurality of second electrodes (not illustrated). In the present embodiment, a layout structure of the touch panel 430 may be identical to those shown in FIG. 1 to FIG. 3 for example, which is not particularly limited in the invention. The touch controller 930 includes a plurality of signal processing channels CH_1 to CH_13 configured to control the touch panel 430. The signal processing channels CH_1 to CH_13 are configured to drive one of the first electrode and the second electrode in the touch panel 430 served as the driving electrode, and to sense a capacitance at where another one of the first electrode and the second electrode in the touch panel 430 served as the sensing electrode is located. In the present embodiment, a layout structure of the touch panel 420 may be identical to those shown in FIG. 1 to FIG. 3 for example, which is not particularly limited in the invention.

Referring back to FIG. 7, the touch panel 430 includes three sets of first signal branches TX1 to TX4 and a plurality of second signal routes RX1 to RX18. As similar to the foregoing descriptions regarding FIG. 1, FIG. 2 and FIG. 3, the three sets of the first signal branches TX1 to TX4 of the touch panel 430 are configured to connect aforesaid first electrodes of the touch panel 430 to the touch controller 930, and the second signal routes RX1 to RX18 are configured to connect aforesaid second electrodes of the touch panel 430 to the touch controller 930. Herein, the touch panel 430 is divided into a plurality of areas (e.g., two areas D31 and D32 depicted in FIG. 7). Accordingly, the number D of the divided areas is equal to 3 in this example. Each of the areas D31 and D32 includes three sets of the first signal branches and nine second signal routes. For instance, the area D31 includes three sets of the first signal branches TX1 to TX2 and nine second signal routes RX1 to RX9. Among them, the first signal branches TX1 in the three sets are electrically connected to one another to form a first signal route NTX1, and the first signal branches TX2 in the three sets are electrically connected to one another to form a first signal route NTX2. The area D32 includes three sets of the first signal branches TX3 to TX4 and nine second signal routes RX10 to RX18. Among them, the first signal branches TX3 in the three sets are electrically connected to one another to form a first signal route NTX3, and the first signal branches TX4 in the three sets are electrically connected to one another to form a first signal route NTX4. In other words, in this example, there are substantially two of the first signal routes for connecting the first electrodes to the signal processing channels CH_1 and CH_2 (i.e., a number M of the first signal routes is equal to 2). The first electrodes of the touch panel 430 may be electrically connected to the corresponding signal processing channels CH_1 to CH_4 of the touch controller 930 by using the first signal routes NTX1 to NTX4 respectively. Specifically, in the area D31 of the touch panel 430, a part of the first electrodes is electrically connected to the corresponding signal processing channel CH_1 of the touch controller 930 by using the first signal route NTX1. A part of the first electrodes is electrically connected to the corresponding signal processing channel CH_2 of the touch controller 930 by using the first signal route NTX2. In the area D32 of the touch panel 430, a part of the first electrodes is electrically connected to the corresponding signal processing channel CH_3 of the touch controller 930 by using the first signal route NTX3. A part of the first electrodes is electrically connected to the corresponding signal processing channel CH_4 of the touch controller 930 by using the first signal route NTX4. In other words, in this example, the number M of the first signal routes in each of the areas D31 and D32 is equal to 2. In the present embodiment, a number of the signal processing channels CH_1 to CH_4 of the touch controller 930 electrically connected to the first electrodes is determined according to the product of the number M (i.e., 2) of the first signal routes in each of the areas and the number D (i.e., 2) of the divided areas. That is, the number of the signal processing channels CH_1 to CH_4 is M×D=4.

On the other hand, the second electrodes of the touch panel 430 are electrically connected to the corresponding signal processing channels CH_5 to CH_13 of the touch controller 930 by using the second signal routes RX1 to RX18 respectively. Specifically, in the touch panel 430, a first part of the second electrodes is electrically connected to the corresponding signal processing channel CH_5 of the touch controller 930 by using the second signal routes RX1 and RX10. In this example, the second signal routes RX1 and RX10 are electrically connected to each other and connected to the corresponding signal processing channel CH_5 of the touch controller 930 through the second signal route RX1. However, the invention is not limited thereto. For example, the second signal routes RX1 and RX10 may also be electrically connected to each other and connected to the corresponding signal processing channel CH_5 of the touch controller 930 through the second signal route RX10. A second part of the second electrodes is electrically connected to the corresponding signal processing channel CH_6 of the touch controller 930 by using the second signal routes RX2 and RX11. In this example, the second signal routes RX2 and RX11 are electrically connected to each other and connected to the corresponding signal processing channel CH_6 of the touch controller 930 through the second signal route RX2. However, the invention is not limited thereto. For example, the second signal routes RX2 and RX11 may also be electrically connected to each other and connected to the corresponding signal processing channel CH_6 of the touch controller 930 through the second signal route RX11. Electrical connections between the rest of the second electrodes and the other signal processing channels may be inferred by reference with the foregoing description. Accordingly, by using an area division method and a signal routing method for the touch panel 430 of the touch panel module 3000 depicted in FIG. 7, the touch controller 930 only requires use of thirteen signal processing channels CH_1 to CH_13 for driving and sensing the touch panel 430.

Overall, the number (13) of the signal processing channels CH_1 to CH_13 required by the touch controller 930 depicted in FIG. 7 may be determined according to the number (4) of the first signal routes NTX1 to NTX4, the number (18) of the second signal routes RX1 to RX18 and the number (2) of the divided areas D31 to D32.

In the foregoing embodiment, the number of the signal processing channels CH_1 to CH_13 required by the touch controller 930 depicted in FIG. 7 may also be specifically determined according to the product of the number of the first signal routes in each of the areas D31 to D32 (e.g., the first signal routes NTX1 and NTX2 in the area D31) and the number of the divided areas D31 to D32 plus the ratio of the number of the second signal routes RX1 to RX18 of the touch panel 430 to the number of the divided areas D31 to D32. Specifically, the number of the first signal routes in each of the areas D31 to D32 (e.g., the first signal routes NTX1 and NTX2 of the area D31) is 2, the number of the divided areas of the touch panel 430 is 2, and the number of the second signal routes RX1 to RX18 of the touch panel 430 is 18. Therefore, the number (13) of the signal processing channels CH_1 to CH_13 required by the touch controller 930 may be determined according to the product of 2 and 2 and the ratio of 18 to 2.

More specifically, in the foregoing embodiment, the number (4) of the signal processing channels CH_1 to CH_4 of the touch controller 930 of FIG. 7 electrically connected to the first electrodes is determined according to the product of the number (2) of the first signal routes in each of the areas (e.g., the first signal routes NTX1 and NTX2 of the area D31) and the number (2) of the divided areas D31 to D32.

Furthermore, in the foregoing embodiment, the number (9) of the signal processing channels CH_5 to CH_13 of the touch controller 930 of FIG. 7 electrically connected to the second electrodes is determined according to the ratio of the number (18) of the second signal routes RX1 to RX18 of the touch panel 430 to the number (2) of the divided areas D31 to D32.

In the foregoing embodiment, although the embodiment of FIG. 7 divides the touch panel 430 into the two areas D31 to D32 in which the number of the first signal routes in each of the areas is 2 and the number of the second signal routes of the touch panel 430 is 18, but the invention is not limited thereto. In other words, the touch panel 430 may also be divided into a D number of areas, and the number of the first signal routes in each of the areas may be M, and the number of the second signal routes of the touch panel 430 may be N. Among them, M, N and D are positive integers. Accordingly, it can be inferred from the related descriptions of the embodiment of FIG. 5 that, the number of the signal processing channels required by the touch controller 930 is (N/D)+(M×D).

In the foregoing embodiment depicted in FIG. 7, the touch panel 430 includes six touch sensing units U71 to U76, and each of the touch sensing units U71 to U76 includes one or more of the first electrodes and one or more of the second electrodes.

In the foregoing embodiment, in each of the areas D31 to D32 of FIG. 7, the first signal routes NTX1 to NTX4 are electrically connected to the corresponding first electrodes of each of the touch sensing units U71 to U76 respectively. For instance, in the area D31, the first signal route NTX1 is electrically connected to the corresponding first electrodes of the touch sensing units U71, U72 and U73, and the first signal route NTX2 is electrically connected to the corresponding first electrodes of the touch sensing units U71, U72 and U73. Details regarding the first signal route and the corresponding first electrodes may refer to the same in FIG. 1, FIG. 2 and FIG. 3, which are not repeated hereinafter.

In the foregoing embodiment, the second signal routes RX1 to RX18 of the touch panel 430 are grouped into one or more groups according to a number of the touch sensing units U71 to U76 included in each of the areas D31 to D32. For instance, the area D31 of FIG. 7 includes three of the corresponding touch sensing units U71 and U73, and thus the second signal routes RX1 to RX18 are grouped into three groups G71 to G73. Further, in the touch panel 430, the group G71 of the second signal routes is electrically connected the corresponding touch sensing units U71 and U74 in each of the areas D31 to D32. The group G72 of the second signal routes is electrically connected the corresponding touch sensing units U72 and U75 in each of the areas D31 to D32. The group G73 of the second signal routes is electrically connected the corresponding touch sensing units U73 and U76 in each of the areas D31 to D32. Furthermore, each of the groups G71 to G73 of the second signal routes includes one or more of the second signal routes RX1 to RX18. In each of the groups G71 to G73 of the second signal routes, the one or more of the second signal routes are electrically connected to the corresponding second electrodes of the corresponding touch sensing units U71 to U76 respectively. For instance, the group G71 of the second signal routes includes the second signal routes RX1 to RX3 and RX10 to RX12, the group G72 of the second signal routes includes the second signal routes RX4 to RX6 and RX13 to RX15, and the group G73 of the second signal routes includes the second signal routes RX7 to RX9 and RX16 to RX18. In the group G71 of the second signal routes, the second signal routes RX1 and RX10 are electrically connected to each other and connected to the corresponding second electrodes of the corresponding touch sensing units U71 and U74. In the group G71 of the second signal routes, the second signal routes RX2 and RX11 are electrically connected to each other and connected to the corresponding second electrodes of the corresponding touch sensing units U71 and U74. In the group G71 of the second signal routes, the second signal routes RX3 and RX12 are electrically connected to each other and connected to the corresponding second electrodes of the corresponding touch sensing units U71 and U74. In the group G72 of the second signal routes, the second signal routes RX4 and RX13 are electrically connected to each other and connected to the corresponding second electrodes of the corresponding touch sensing units U72 and U75. In the group G72 of the second signal routes, the second signal routes RX5 and RX14 are electrically connected to each other and connected to the corresponding second electrodes of the corresponding touch sensing units U72 and U75. In the group G72 of the second signal routes, the second signal routes RX6 and RX15 are electrically connected to each other and connected to the corresponding second electrodes of the corresponding touch sensing units U72 and U75. In the group G73 of the second signal routes, the second signal routes RX7 and RX16 are electrically connected to each other and connected to the corresponding second electrodes of the corresponding touch sensing units U73 and U76. In the group G73 of the second signal routes, the second signal routes RX8 and RX17 are electrically connected to each other and connected to the corresponding second electrodes of the corresponding touch sensing units U73 and U76. In the group G73 of the second signal routes, the second signal routes RX9 and RX18 are electrically connected to each other and connected to the corresponding second electrodes of the corresponding touch sensing units U73 and U76.

According to the foregoing embodiments of FIG. 4 to FIG. 7, in the touch panels 400, 410, 420 and 430, the first electrodes and the second electrodes are disposed in the same conductive layer of a substrate. In other words, the touch panels 400, 410, 420 and 430 belong to a single-layer and multi-touch capacitive touch panel, but the invention is not limited thereto. In other embodiments of the invention, the first electrodes and the second electrodes of the touch panel may also be disposed in different conductive layers. In other words, the touch panel may also be a double-layer and multi-touch capacitive touch panel.

Figure 8:
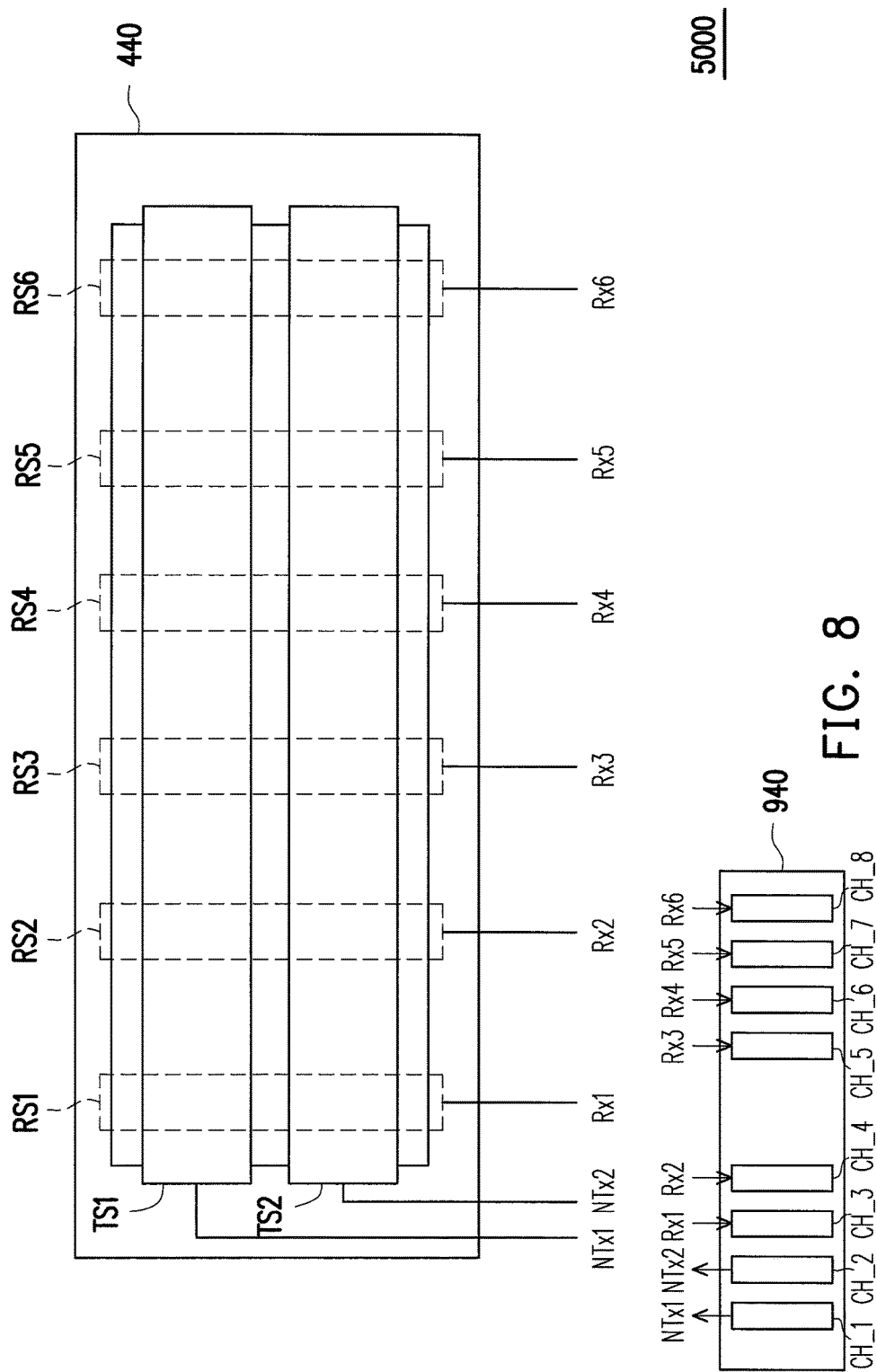
FIG. 8 is a block schematic diagram illustrating a touch panel module according to yet another embodiment of the invention.

The following refers to FIG. 8, which is a block schematic diagram illustrating a touch panel module 5000 according to yet another embodiment of the invention. The touch panel module 5000 includes a touch panel 440 and a touch controller 940. The touch panel 440 includes two first electrode strings TS1 and TS2 and six second electrode strings RS1 to RS6, but the invention is not limited thereto. Numbers of the first electrode strings and the second electrode strings are decided based on design requirements. Each of the first electrode strings TS1 and TS2 includes six first electrodes (not illustrated), and each of the second electrode strings RS1 to RS6 includes two second electrodes (not illustrated). The first electrode strings TS1 and TS2 and the second electrode strings RS1 to RS6 are disposed in different conductive layers. It should be noted that, in the present embodiment, a number of the first electrodes included in each of the first electrode strings TS1 and TS2 and a number of the second electrodes included in each of the second electrode strings RS1 to RS6 are only illustrative instead of limiting the invention. The first electrode strings TS1 and TS2 and the second electrode strings RS1 to RS6 respectively extend along different directions. For example, the first electrode strings TS1 and TS2 extend along a horizontal direction, and the second electrode strings RS1 to RS6 extend along a vertical direction. An orthogonal projection of the first electrode strings TS1 and TS2 on the conductive layer where the second electrode strings RS1 to RS6 are located is substantially perpendicular to the second electrode strings RS1 to RS6, as shown in FIG. 8. The first electrode strings TS1 and TS2 and the second electrode strings RS1 to RS6 may be any transparent conductive materials such as indium-tin oxide (ITO), and so on. The touch controller 940 includes a plurality of signal processing channels CH_1 to CH_8 configured to control the touch panel 440. The signal processing channels CH_1 to CH_8 are configured to drive one of the first electrode and the second electrode in the touch panel 440 served as the driving electrode, and to sense a capacitance at where another one of the first electrode and the second electrode in the touch panel 440 served as the sensing electrode is located.

In the embodiment depicted in FIG. 8, the touch panel 440 is not yet divided into areas. However, from another perspective, it may also be regarded as being divided into one area (i.e., a number D of the divided areas is equal to 1). In the touch panel 440, the first electrode strings TS1 and TS2 are connected to the two signal processing channels CH_1 and CH_2 of the touch controller 940 by using two first signal routes NTX1 and NTX2 respectively, and the second electrode strings RS1 to RS6 are connected to the six signal processing channels CH_3 to CH_8 of the touch controller 940 by using second signal routes RX1 to RX6 respectively. Therefore, a number of the signal processing channels used by the touch controller 940 is eight.

Figure 9:
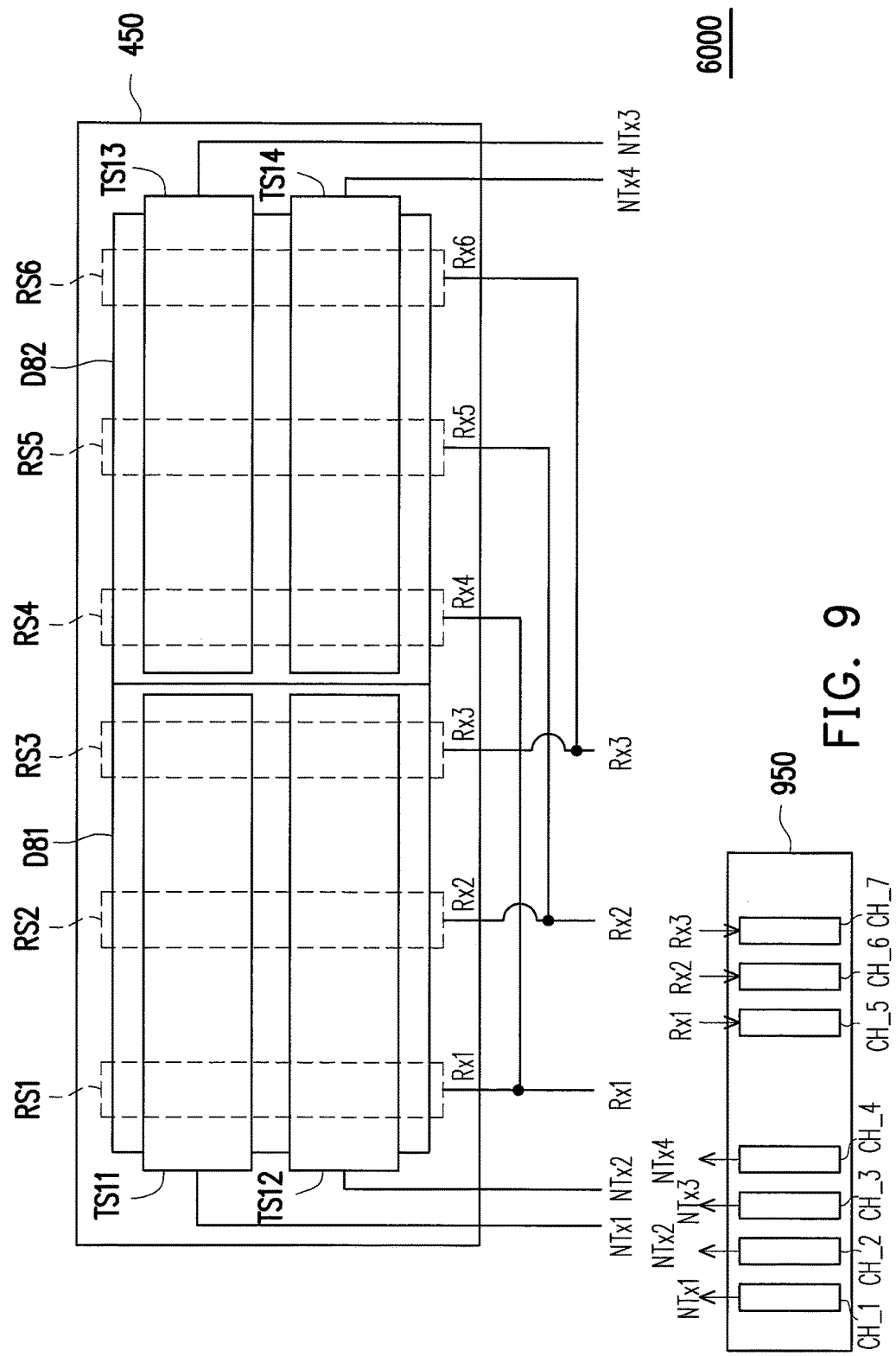
FIG. 9 is a block schematic diagram illustrating a touch panel module according to yet another embodiment of the invention.

Referring to FIG. 8 and FIG. 9 together. FIG. 9 is a block schematic diagram illustrating a touch panel module 6000 according to yet another embodiment of the invention. In order to reduce the number of the signal processing channels used by the touch controller 940, the touch panel 440 of FIG. 8 may be divided into a plurality of areas. For example, a touch panel 450 is divided into two areas D81 and D82 (i.e., D=2). The following refers to FIG. 9. Each of the areas D81 and D82 includes two first electrode strings and three second electrode strings. For instance, the area D81 includes two first electrode strings TS11 and TS12 and three second electrode strings RS1 to RS3, and the area D82 includes two first electrode strings TS13 and TS14 and three second electrode strings RS4 to RS6. The first electrodes of the first electrode strings TS11 to TS14 of the touch panel 450 may be electrically connected to the corresponding signal processing channels CH_1 to CH_4 of the touch controller 950 by using the first signal routes NTX1 to NTX4 respectively. Specifically, in the area D81 of the touch panel 450, the first electrodes of the first electrode string TS11 are electrically connected to the corresponding signal processing channel CH_1 of the touch controller 950 by using the first signal route NTX1. The first electrodes of the first electrode string TS12 are electrically connected to the corresponding signal processing channel CH_2 of the touch controller 950 by using the first signal route NTX2. Specifically, in the area D82 of the touch panel 450, the first electrodes of the first electrode string TS13 are electrically connected to the corresponding signal processing channel CH_3 of the touch controller 950 by using the first signal route NTX3. The first electrodes of the first electrode string TS14 are electrically connected to the corresponding signal processing channel CH_4 of the touch controller 950 by using the first signal route NTX4. In other words, in this example, the number M of the first signal routes in each of the areas D81 and D82 is equal to 2. In the present embodiment, a number of the signal processing channels CH_1 to CH_4 of the touch controller 950 electrically connected to the first electrodes is determined according to the product of the number M (i.e., 2) of the first signal routes in each of the areas and the number D (i.e., 2) of the divided areas. That is, the number of the signal processing channels CH_1 to CH_4 is M×D=4.

On the other hand, the second electrodes of the second electrode string RS1 to RS6 of the touch panel 450 are electrically connected to the corresponding signal processing channels CH_5 to CH_7 of the touch controller 950 by using the second signal routes RX1 to RX6 respectively. Specifically, in the touch panel 450, the second electrodes of the second electrode strings RS1 and RS4 are electrically connected to the corresponding signal processing channel CH_5 of the touch controller 950 by using the second signal routes RX1 and RX4. In this example, the second signal routes RX1 and RX4 are electrically connected to each other and connected to the corresponding signal processing channel CH_5 of the touch controller 950 through the second signal route RX1. However, the invention is not limited thereto. For example, the second signal routes RX1 and RX4 may also be electrically connected to each other and connected to the corresponding signal processing channel CH_5 of the touch controller 950 through the second signal route RX4. The second electrodes of the second electrode strings RS2 and RS5 are electrically connected to the corresponding signal processing channel CH_6 of the touch controller 950 by using the second signal routes RX2 and RX5. In this example, the second signal routes RX2 and RX5 are electrically connected to each other and connected to the corresponding signal processing channel CH_6 of the touch controller 950 through the second signal route RX2. However, the invention is not limited thereto. For example, the second signal routes RX2 and RX5 may also be electrically connected to each other and connected to the corresponding signal processing channel CH_6 of the touch controller 950 through the second signal route RX5. The second electrodes of the second electrode strings RS3 and RS6 are electrically connected to the corresponding signal processing channel CH_7 of the touch controller 950 by using the second signal routes RX3 and RX6. In this example, the second signal routes RX3 and RX6 are electrically connected to each other and connected to the corresponding signal processing channel CH_7 of the touch controller 950 through the second signal route RX3. However, the invention is not limited thereto. For example, the second signal routes RX3 and RX6 may also be electrically connected to each other and connected to the corresponding signal processing channel CH_7 of the touch controller 950 through the second signal route RX6. Accordingly, by using an area division method and a signal routing method for the touch panel 450 of the touch panel module 6000 depicted in FIG. 9, the touch controller 950 only requires use of seven signal processing channels CH_1 to CH_7 for driving and sensing the touch panel 450.

Overall, the number (7) of the signal processing channels CH_1 to CH_7 required by the touch controller 950 depicted in FIG. 9 may be determined according to the number (4) of the first signal routes NTX1 to NTX4, the number (6) of the second signal routes RX1 to RX6 and the number (2) of the divided areas D81 to D82.

It should be noted that, in all embodiments of the invention, the number of the divided areas of the touch panel may be determined according to the number of the first signal routes and the number of the second signal routes, so as to reduce the number of the signal processing channels required by the touch controller. More specifically, when the number of the first signal routes in each of the areas is greater than the number of the second signal routes of the touch panel, as long as a ratio of the number of the first signal routes in each of the areas to the number of the second signal routes of the touch panel is greater than the number of the divided areas (the number of the areas is at least two), the number of the signal processing channels required by the touch controller may be reduced. Similarly, when the number of the second signal routes of the touch panel is greater than the number of the first signal routes in each of the areas, as long as a ratio of the number of the second signal routes of the touch panel to the number of the first signal routes in each of the areas is greater than the number of the divided areas of the touch panel (the number of areas is at least two), the number of the signal processing channels required by the touch controller may be reduced. In addition, if the number of the second signal routes is greater than the number of the first signal routes, the touch panel may be divided into the areas in an arranging direction of the second electrodes.

For better understanding of above description, FIG. 9 is used as an example, and the foregoing embodiments of FIG. 5 to FIG. 7 may also be inferred by the same description. The following refers back to FIG. 9. In FIG. 9, the number of the first signal routes in each of the areas (e.g., the first signal routes NTX1 and NTX2 in the area D81) is two, and the number of the second signal routes RX1 to RX6 of the touch panel 450 is six, and a ratio of a greater one among the number (2) of the first signal routes in each of the areas and the number (6) of the second signal routes of the touch panel 450 (i.e., 6) to a smaller one among the number (2) of the first signal routes in each of the areas and the number (6) of the second signal routes of the touch panel 450 (i.e., 2) is 3. Accordingly, when the number of divided areas of the touch panel 450 of FIG. 9 is less than 3, the number (7) of the signal processing channels required by the touch controller 950 of FIG. 9 may be less than the number (8) of the signal processing channels required by the touch controller 940 of FIG. 8. In addition, the number (6) of the second signal routes of the touch panel 440 of FIG. 8 is greater than the number (2) of the first signal routes of the touch panel 440, and thus the touch panel 450 of FIG. 9 may be divided into two areas in the arranging direction (the horizontal direction) of the second electrodes.

In summary, in the touch panel module and the touch controller according to the exemplary embodiments of the invention, the touch panel is divided into a plurality of areas, so that the number of the signal processing channels of the touch controller may be determined according to the number of the first signal routes, the number of the second signal routes and the number of the divided areas. Accordingly, the signal processor channels of the touch controller may be reduced to further reduce the manufacturing costs of the touch controller. Moreover, the number of the divided areas of the touch panel may be determined according to the number of the first signal routes and the number of the second signal routes. In other words, when the number of the first signal routes in each of the areas is greater than the number of the second signal routes of the touch panel, as long as a ratio of the number of the first signal routes in each of the areas to the number of the second signal routes of the touch panel is greater than the number of the divided areas (the number of the areas is at least two), the number of the signal processing channels required by the touch controller may be reduced. Similarly, when the number of the second signal routes of the touch panel is greater than the number of the first signal routes in each of the areas, as long as a ratio of the number of the second signal routes of the touch panel to the number of the first signal routes in each of the areas is greater than the number of the divided areas of the touch panel (the number of areas is at least two), the number of the signal processing channels required by the touch controller may be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch panel module, comprising:
    a touch controller, comprising a plurality of signal processing channels; and
    a touch panel, electrically connected to the touch controller, and comprising:
        a plurality of first electrodes, electrically connected to the corresponding signal processing channels of the touch controller by using a plurality of first signal routes; and
        a plurality of second electrodes, electrically connected to the corresponding signal processing channels of the touch controller by using a plurality of second signal routes,
    wherein the touch panel is divided into a plurality of areas, and a number of the signal processing channels of the touch controller is determined according to a number of the first signal routes, a number of the second signal routes and a number of the divided areas,
    wherein the number of the first signal routes in each of the areas is M, the number of the second signal routes of the touch panel is N, the number of the divided areas is D, and the number of the signal processing channels of the touch controller is (N/D)+(M×D), wherein M, N and D are positive integers.

2. The touch panel module of claim 1, wherein a number of the signal processing channels of the touch controller electrically connected to the first electrodes is determined according to the product of the number of the first signal routes in each of the areas and the number of the divided areas.

3. The touch panel module of claim 1, wherein a number of the signal processing channels of the touch controller electrically connected to the second electrodes is determined according to the ratio of the number of the second signal routes of the touch panel to the number of the divided areas.

4. The touch panel module of claim 1, wherein the touch panel comprises a plurality of touch sensing units, and each of the touch sensing units comprises one or more of the first electrodes and one or more of the second electrodes.

5. The touch panel module of claim 4, wherein in each of the areas, the first signal routes are electrically connected to the corresponding first electrodes of each of the touch sensing units respectively.

6. The touch panel module of claim 4, wherein in the touch panel, the second signal routes are grouped into one or more groups according to a number of the touch sensing units included in each of the areas.

7. The touch panel module of claim 6, wherein in the touch panel, each of the groups of the second signal routes is electrically connected to at least one touch sensing unit of the touch sensing units in each of the areas.

8. The touch panel module of claim 7, wherein each of the groups of the second signal routes comprises one or more of the second signal routes, wherein in each of the groups of the second signal routes, the one or more of the second signal routes are electrically connected to the corresponding second electrodes of the corresponding touch sensing units respectively.

9. The touch panel module of claim 1, wherein the touch panel determines the number of the divided areas according to the number of the first signal routes and the number of the second signal routes.

10. The touch panel module of claim 9, wherein the number of the divided areas is less than a ratio of a first number to a second number, the first number is a greater one among the number of the first signal routes in each of the areas and the number of the second signal routes of the touch panel, and the second number is a smaller one among the number of the first signal routes in each of the areas and the number of the second signal routes of the touch panel.

11. The touch panel module of claim 1, wherein the number of the second signal routes is greater than the number of the first signal routes, and the touch panel are divided into the areas in an arranging direction of the second electrodes.

12. The touch panel module of claim 1, wherein each of the first electrodes is selected from one of a driving electrode and a sensing electrode of the touch panel, and each of the second electrodes is selected from another one of the driving electrode and the sensing electrode of the touch panel.

13. A touch controller, comprising:
a plurality of signal processing channels, configured to control a touch panel,
wherein the touch panel comprises a plurality of first electrodes and a plurality of second electrodes, which are electrically connected to the signal processing channels of the touch controller by using a plurality of first signal routes and a plurality of second signal routes respectively,
wherein the touch panel is divided into a plurality of areas, and a number of the signal processing channels of the touch controller is determined according to a number of the first signal routes, a number of the second signal routes and a number of the divided areas,
wherein the number of the first signal routes in each of the areas is M, the number of the second signal routes of the touch panel is N, the number of the divided areas is D, and the number of the signal processing channels of the touch controller is (N/D)+(M×D), wherein M, N and D are positive integers.

14. The touch controller of claim 13, wherein a number of the signal processing channels of the touch controller electrically connected to the first electrodes is determined according to the product of the number of the first signal routes in each of the areas and the number of the divided areas.

15. The touch controller of claim 13, wherein a number of the signal processing channels of the touch controller electrically connected to the second electrodes is determined according to the ratio of the number of the second signal routes of the touch panel to the number of the divided areas.

16. The touch controller of claim 13, wherein the touch panel comprises a plurality of touch sensing units, and each of the touch sensing units comprises one or more of the first electrodes and one or more of the second electrodes.

17. The touch controller of claim 16, wherein in each of the areas, the first signal routes are electrically connected to the corresponding first electrodes of each of the touch sensing units respectively.

18. The touch controller of claim 16, wherein in the touch panel, the second signal routes are grouped into one or more groups according to a number of the touch sensing units included in each of the areas.

19. The touch controller of claim 18, wherein in the touch panel, each of the groups of the second signal routes is electrically connected to at least one touch sensing unit of the touch sensing units in each of the areas.

20. The touch controller of claim 19, wherein each of the groups of the second signal routes comprises one or more of the second signal routes, wherein in each of the groups of the second signal routes, the one or more of the second signal routes are electrically connected to the corresponding second electrodes of the corresponding touch sensing units respectively.

21. The touch controller of claim 13, wherein the touch panel determines the number of the divided areas according to the number of the first signal routes and the number of the second signal routes.

22. The touch controller of claim 21, wherein the number of the divided areas is less than a ratio of a first number to a second number, the first number is a greater one among the number of the first signal routes in each of the areas and the number of the second signal routes of the touch panel, and the second number is a smaller one among the number of the first signal routes in each of the areas and the number of the second signal routes of the touch panel.

23. The touch controller of claim 13, wherein the number of the second signal routes is greater than the number of the first signal routes, and the touch panel are divided into the areas in an arranging direction of the second electrodes.

24. The touch controller of claim 13, wherein the first electrodes are selected from one of a driving electrode and a sensing electrode of the touch panel, and the second electrodes are selected from another one of the driving electrode and the sensing electrode of the touch panel.

* * * * *